United States Patent
Wang et al.

(10) Patent No.: US 8,949,934 B2
(45) Date of Patent: Feb. 3, 2015

(54) COMMUNICATION DEVICE, COMMUNICATION METHOD, AND PROGRAM

(75) Inventors: Qihong Wang, Tokyo (JP); Akihiro Komori, Tokyo (JP); Tomohisa Tanaka, Tokyo (JP); Tsuyoshi Ishikawa, Kanagawa (JP)

(73) Assignee: Sony Corporation (JP)

( * ) Notice: Subject to any disclaimer, the term of this patent is extended or adjusted under 35 U.S.C. 154(b) by 47 days.

(21) Appl. No.: 13/456,488

(22) Filed: Apr. 26, 2012

(65) Prior Publication Data

US 2012/0291093 A1 Nov. 15, 2012

(30) Foreign Application Priority Data

May 11, 2011 (JP) ................................. 2011-106029

(51) Int. Cl.

| | |
|---|---|
| *G06F 7/04* | (2006.01) |
| *G06F 17/30* | (2006.01) |
| *H04L 9/32* | (2006.01) |
| *G06F 21/36* | (2013.01) |
| *H04W 12/06* | (2009.01) |

(52) U.S. Cl.
CPC .............. *H04L 9/3215* (2013.01); *G06F 21/36* (2013.01); *H04W 12/06* (2013.01)
USPC ............................................. 726/2; 713/168

(58) Field of Classification Search
CPC ........ G06F 21/36; G06F 21/44; G06F 21/445

USPC ....................................... 713/168, 169; 726/2
See application file for complete search history.

(56) References Cited

U.S. PATENT DOCUMENTS

| | | | |
|---|---|---|---|
| 7,257,354 B2 | 8/2007 | Schlageter et al. | |
| 7,437,106 B2 | 10/2008 | Schlageter et al. | |
| 7,653,655 B2 | 1/2010 | Tokoro et al. | |
| 8,316,234 B2 * | 11/2012 | Huberman et al. | ........... 713/168 |
| 2005/0160479 A1 * | 7/2005 | Kubota | ............................ 726/16 |
| 2007/0147815 A1 * | 6/2007 | Tanaka | .............................. 396/56 |
| 2011/0072500 A1 * | 3/2011 | Varghese | ........................... 726/7 |
| 2012/0162474 A1 * | 6/2012 | Sukegawa | ................ 348/231.99 |

FOREIGN PATENT DOCUMENTS

| | | |
|---|---|---|
| JP | 4178697 A | 6/1992 |
| JP | 4074998 B2 | 4/2008 |

* cited by examiner

*Primary Examiner* — Andrew Nalven
*Assistant Examiner* — Quy Pham
(74) *Attorney, Agent, or Firm* — Lerner, David, Littenberg, Krumholz & Mentlik, LLP

(57) ABSTRACT

There is provided a communication device including a determination unit for determining whether authentication information presented to a user of another communication device is consistent with comparison information transmitted from the other communication device capable of obtaining and transmitting the authentication information, and an authentication unit, when it is determined that the authentication information is consistent with the comparison information, for authenticating the other communication device as an opposite communication party.

5 Claims, 17 Drawing Sheets

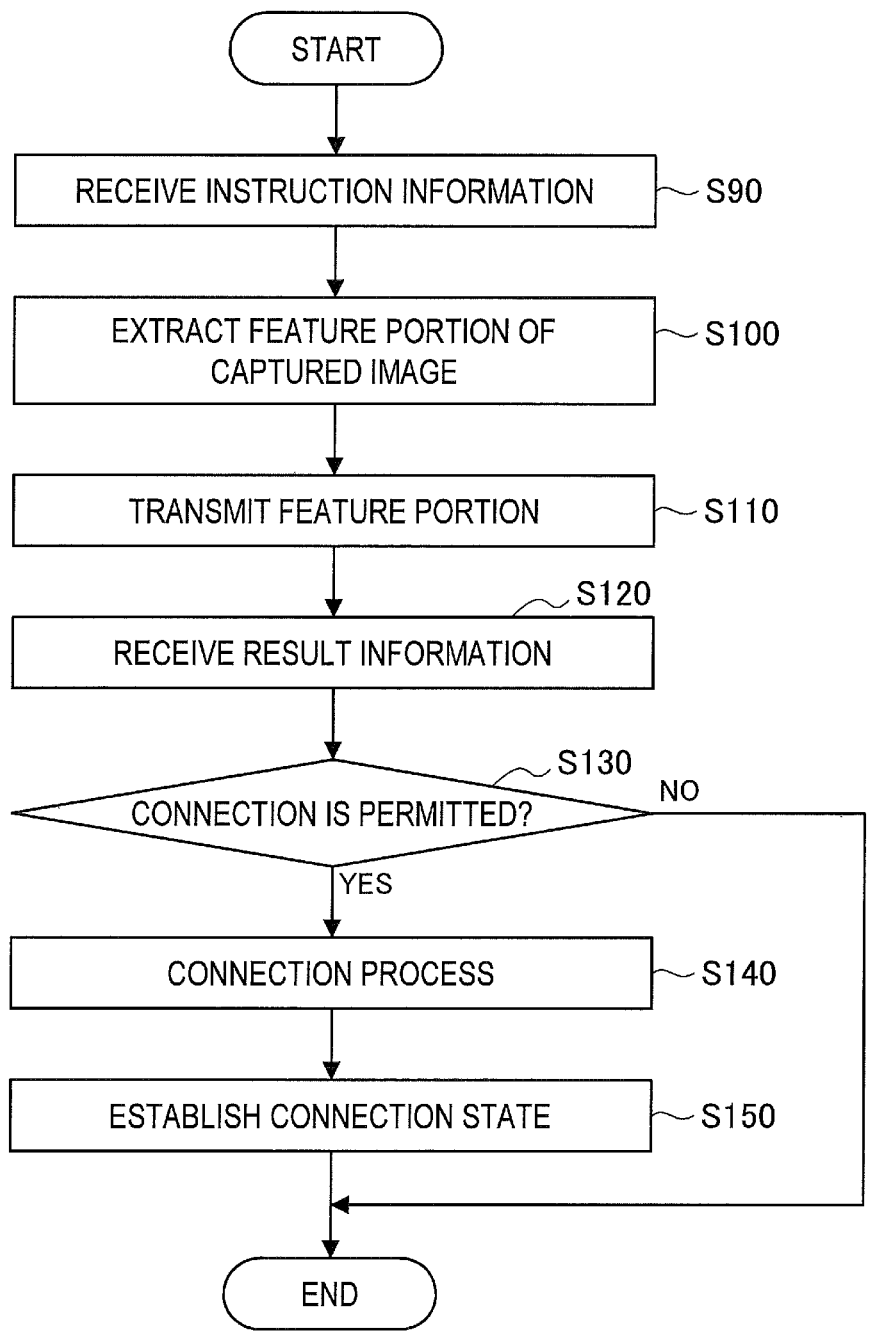

COMMUNICATION DEVICE, COMMUNICATION METHOD, AND PROGRAM

CROSS-REFERENCE TO RELATED APPLICATION

The present application claims priority from Japanese Patent Application No. JP 2011-106029 filed in the Japanese Patent Office on May 11, 2011, the entire content of which is incorporated herein by reference.

BACKGROUND

The present disclosure relates to a communication device, a communication method, and a program.

To allow communication between communication devices, it is necessary that they recognize the presence of each other and then one communication device authenticates another communication device as an opposite communication party. Technologies that one communication device recognizes another are disclosed in JP 4074998B and JP 4178697B. JP 4074998B discloses a technology that one communication device generates a real-world event (e.g., light of a waveform pattern) and another communication device recognizes the real-world event. Then, the one communication device searches for the other communication device which has recognized the real-world event and thus recognizes the other communication device as an opposite communication party.

JP 4178697B discloses a technology that one communication device captures another communication device and generates a network address indicating the other communication device based on the captured image. This allows the one communication device to recognize the other communication device.

Then, the one communication device performs an authentication process to authenticate the other communication device as an opposite communication party.

SUMMARY

From the viewpoint of communication security, well-known authentication processes require a user of an opposite communication device to enter password. For this reason, the well-known authentication processes have been very difficult and time-consuming for a user. Therefore, it is desirable to provide a technology which is capable of reducing the user's time and effort needed to perform an authentication process.

According to an embodiment of the present disclosure, there is provided a communication device which includes a determination unit for determining whether authentication information presented to a user of another communication device is consistent with comparison information transmitted from the other communication device capable of obtaining and transmitting the authentication information; and an authentication unit, when it is determined that the authentication information is consistent with the comparison information, for authenticating the other communication device as an opposite communication party.

Further, according to another embodiment of the present disclosure, there is provided a communication method which includes determining whether authentication information recognizable by a user of another communication device is consistent with comparison information transmitted from the other communication device capable of obtaining and transmitting the authentication information; and authenticating, when it is determined that the authentication information is consistent with the comparison information, the other communication as an opposite communication party.

Moreover, according to still another embodiment of the present disclosure, there is provided a program for causing a computer to perform: a determination function for determining whether authentication information recognizable by a user of another communication device is consistent with comparison information transmitted from the other communication device capable of obtaining and transmitting the authentication information; and an authentication function, when it is determined that the authentication information is consistent with the comparison information, for authenticating the other communication device as an opposite communication party.

According to the embodiments of the present disclosure described above, it is possible to reduce the user's time and effort needed to perform an authentication process.

BRIEF DESCRIPTION OF THE DRAWINGS

FIG. 5B is a flow chart showing the processing procedure in a communication system;

DETAILED DESCRIPTION OF THE EMBODIMENTS

Hereinafter, preferred embodiments of the present disclosure will be described in detail with reference to the appended drawings. Note that, in this specification and the appended drawings, structural elements that have substantially the same Also, the detailed description of the embodiments will be described in the following order.

1. First Embodiment
   1-1. External Configuration of Communication System
   1-2. Configuration of Master Device
   1-3. Configuration of Slave Device
   1-4. Process of Communication System
   1-5. Modified Example
2. Second Embodiment
   2-1. External Configuration of Communication System
   2-2. Configuration of Master Device
   2-3. Process of Communication System
3. Third Embodiment
   3-1. External Configuration of Communication System
   3-2. Configuration of Master Device
   3-3. Process of Communication System

1. First Embodiment

1-1. External Configuration of Communication System

Figure 1:
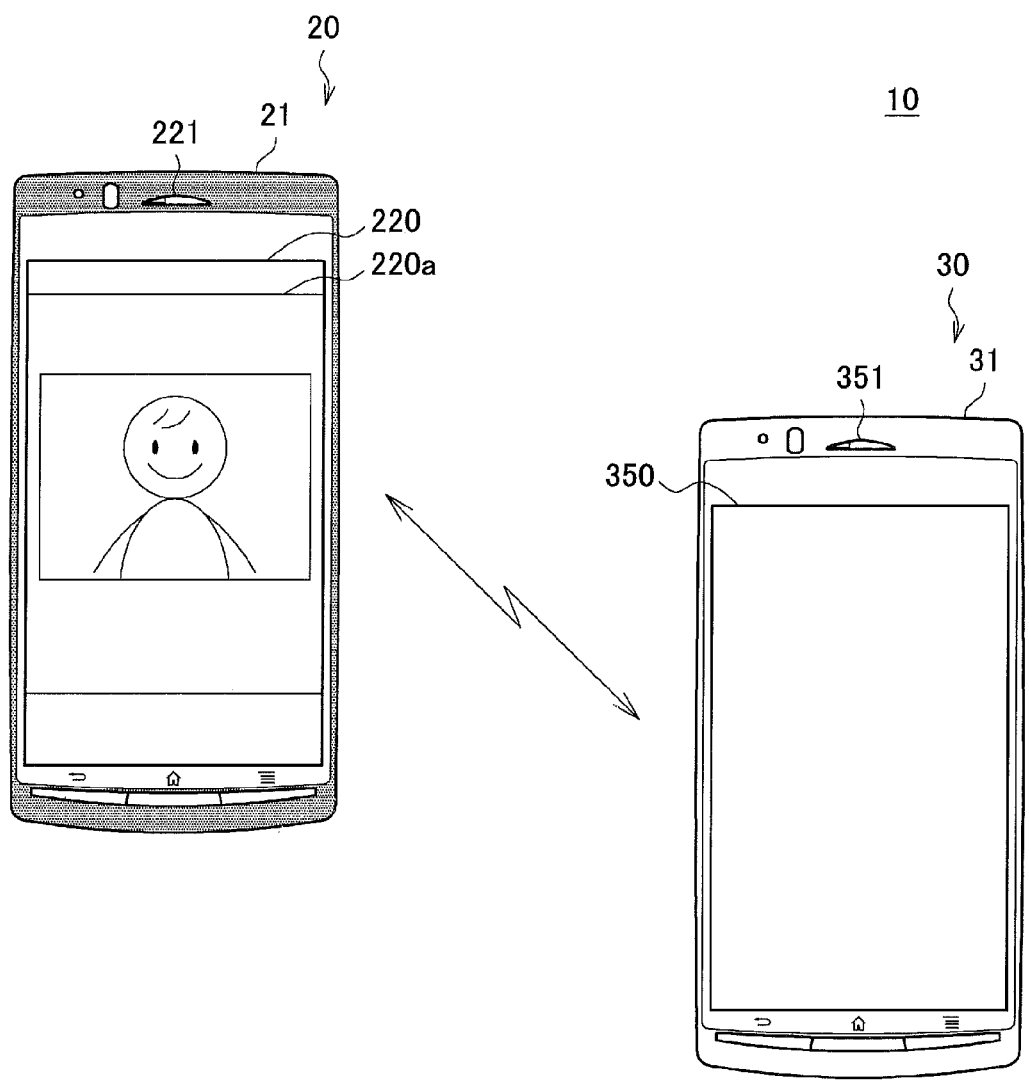
FIG. 1 is a diagram illustrating the configuration of a communication system in accordance with a first embodiment.
Figure 2:
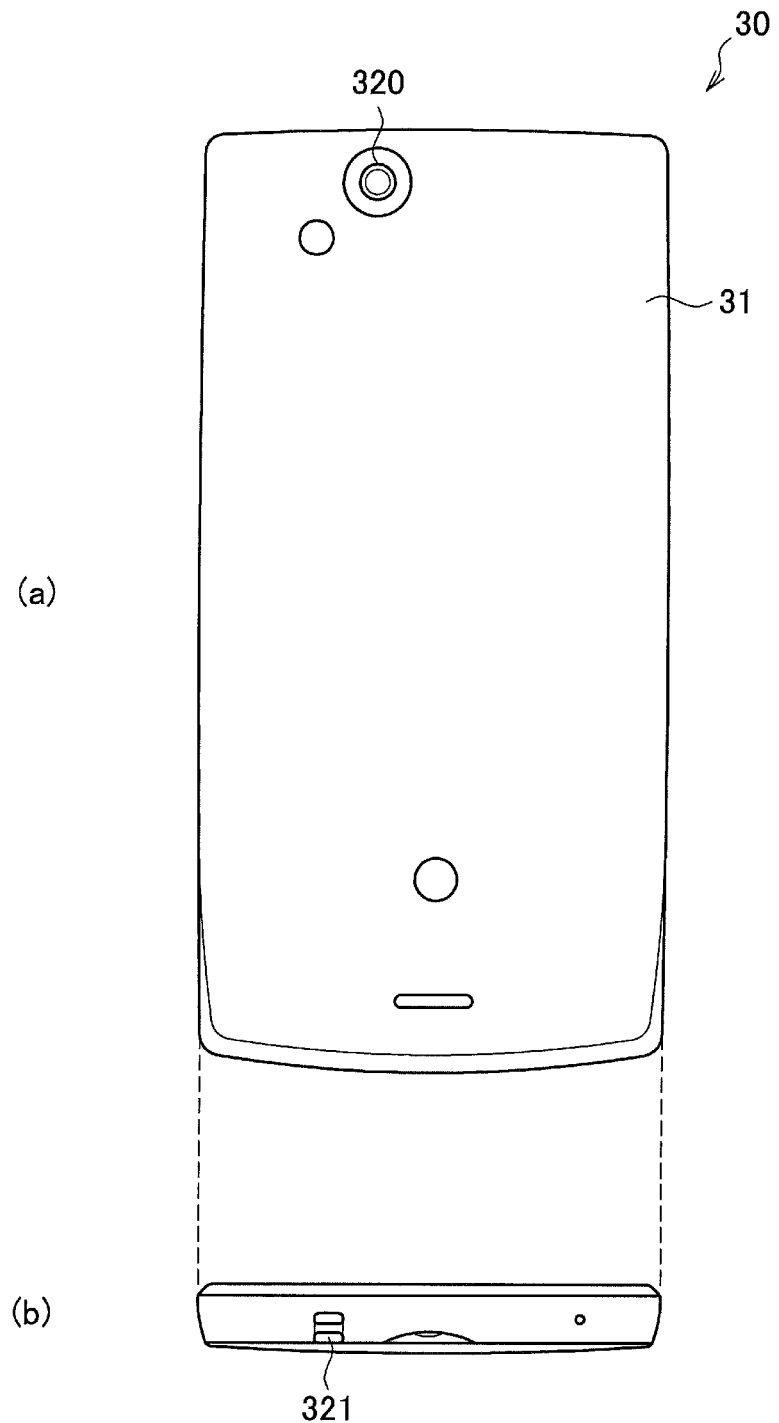
FIG. 2 is a diagram illustrating the configuration of a communication device in accordance with the first embodiment.

The external configuration of a communication system 10 will be described with reference to FIG. 1 and FIG. 2. Further, (a) in FIG. 2 is a rear view of a communication device 30, and (b) in FIG. 2 is a side view (bottom view) thereof. The communication system 10 includes a communication device 20 functioning as a master device and the communication device 30 functioning as a slave device. The communication device 20 is configured to include a main body 21, a display 220 and a speaker 221, as shown in its external configuration. The communication device 20 may further include a camera and/or a microphone. The communication device 30 is configured to include a main body 31, a camera 320, a microphone 321, a display 350 and a speaker 351, as shown in its external configuration.

In the communication system 10, the following processes will be performed. The communication devices 10, 20 recognize the presence of each other. As an example, the communication device 20 transmits a search signal having its own IP address (e.g., Probe Request signal defined at the Wi-Fi Alliance) to its surroundings. The communication device 30, when receiving the search signal, recognizes the presence of the communication device 20. Then, the communication device 30 replies by sending a response signal having its own IP address (e.g., Probe Response signal defined at the Wi-Fi Alliance) to the communication device 20. This allows the communication device 20 to recognize the presence of the communication device 30. Then, the communication device 20 presents authentication information to a user of the communication device 30. For example, the communication device 20 causes the display 220 to display authentication image information 220a as authentication information. Furthermore, the communication device 20 causes the speaker 221 to output authentication audio information as authentication information.

The communication device 30 acquires authentication information based on a user's input operation. For example, the communication device 30 captures the authentication image information 220a. Alternatively, the communication device 30 gets (e.g., record) audio information by the microphone 321. The communication device 30 acquires the authentication information as comparison information. More specifically, the communication device 30 acquires the authentication image information as comparison image information and acquires the authentication audio information as comparison audio information.

The communication device 30 extracts a feature from the comparison information. The communication device 30 generates feature portion information related to the extracted feature portion and transmits a connection request signal including the feature portion information to the communication device 20. The communication device 20 receives the connection request signal and determines whether the feature portion which is indicated by the feature portion information is consistent with feature portion of the authentication information. If it is determined that they are consistent with each other, then the communication device 30 authenticates the communication device 20 as an opposite communication party. This allows the user of the communication device 30 not to enter password in an authentication process, thereby reducing the user's time and effort needed to perform the authentication process.

1-2. Configuration of Master Device

Figure 3:
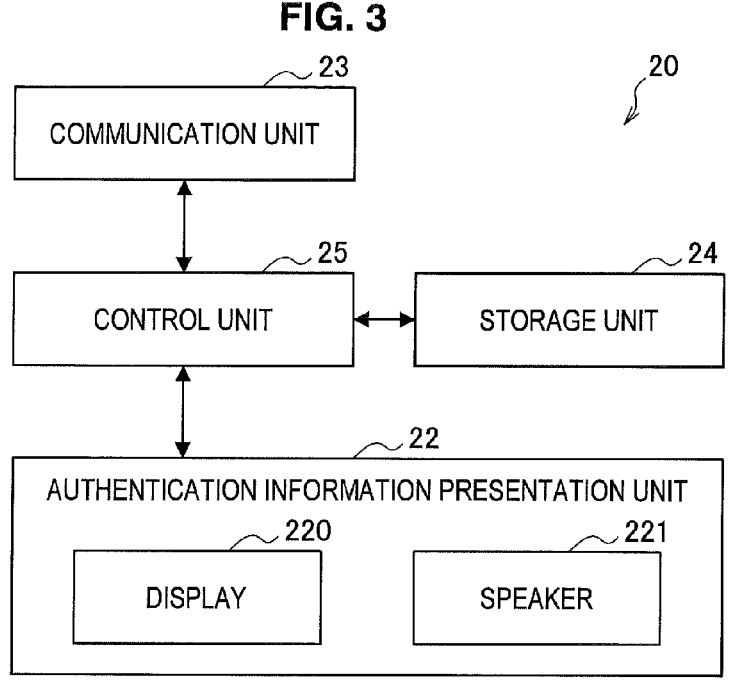
FIG. 3 is a block diagram showing the configuration of a communication device.

Next, the detailed configuration of the communication device 20 which may be a master device will be described with reference to FIG. 1 and FIG. 3. The communication device 20 includes a main body 21, an authentication information presentation unit 22, a communication unit 23, a storage unit 24, and a control unit 25.

The main body 21 contains components of the communication device 20, for example, the communication unit 23, the storage unit 24, and the control unit 25. The authentication information presentation unit 22 presents the authentication information to a user of the communication device 30. As described above, this authentication information is intended to use for the authentication process in which the communication device 20 authenticates the communication device 30 as an opposite communication party. Because the authentication information is presented to the user of the communication device 30, the communication device can make it easy for the user to understand the authentication process.

The authentication information presentation unit 22 includes the display 220 and the speaker 221. The display 220 presents image information, i.e. authentication image information as authentication information. An example of this authentication information can include any image information representing a variety of objects such as human. The authentication image information has two-dimensional coordinates and color information (e.g., luminance) for each pixel. The two-dimensional coordinate is indicated as a coordinate on the predefined x-y plane. Positioning of an origin may be set arbitrarily. As an example, the origin may be a point at the upper left corner of the authentication image information 220a shown in FIG. 1. The authentication image information may be still or moving images. Also, the authentication image information may be image information representing the shape of the main body 21. In this case, although the authentication information presentation unit 22 may present the authentication image information, it may be configured to cause the communication device 30 to capture the main body 21 of the communication device 20, rather than presenting the authentication image information.

Meanwhile, the speaker 221 presents audio information, i.e. authentication audio information as authentication information. An example of the authentication audio information can include music or the like. The authentication audio information has phase information, frequency information and amplitude information.

The communication unit 23 performs wireless communication with the communication device 30. The communication unit 23, when receiving a signal transmitted from the communication device 30, provides information included in the received signal to the control unit 25. Meanwhile, the communication unit 23 generates a signal including information provided from the control unit 25 and transmits the signal to the communication device 30.

The storage unit 24 stores a program which is read out and executed by the control unit 25 as well as a variety of information necessary for processing by the communication device 20 such as the authentication image information and authentication audio information as mentioned above. Further, the storage unit 24 stores instruction information, as described later. This instruction information is intended to prompt the user of the communication device 30 to acquire the authentication information.

The control unit 25 controls the components of the communication device 20 and also works as a determination unit and an authentication unit. More specifically, the control unit 25, when receiving the feature portion information from the communication unit 23, determines whether the feature portion which is indicated by the feature portion information, i.e. the feature portion of the comparison information are consistent with the feature portion of the authentication information. Then, the control unit 25, when determining that these feature portions are consistent with each other, authenticates the communication device 30 as an opposite communication party.

In this regard, an example of the feature portion of the authentication image information (and comparison image information) can include an edge portion of the authentication image information (e.g., a pixel in which absolute value of the difference between the luminance value of the pixel and that of its adjacent pixel is larger than a predetermined value). Furthermore, an outer edge portion of the authentication image information may also be included in the edge portion. If the authentication image information is moving images, the features portion of the authentication image information may be, for example, feature portions in any one frame of the moving images.

On the other hand, an example of the feature portion of the authentication audio information (and comparison audio information) may be a phase portion whose amplitude is larger than a predetermined value. Of course, the feature portion is not limited to the examples described above. As an example, the feature portion may be a pixel whose luminescent value is larger than a predetermined value or a phase portion whose frequency is larger than a predetermined value. Also, the communication device 30 may transmit the acquired comparison information to the communication device 20 as it is and the communication device 20 may compare the authentication information with the comparison information.

Furthermore, in some cases, the comparison image information may not exactly consistent with the authentication image information depending on the capturing conditions of the communication device 30 (e.g., resolution of camera 320 which will be described later, position and angle of the communication device 30 with respect to the communication device 20). For example, there may be a case where an image size (resolution, aspect ratio and so on) of the comparison image information is different from that of the authentication image information. Also, there may be a case where image information other than the authentication image information (e.g., image information of an object which is present in the vicinity of the communication device 20) is contained in the comparison image information.

Therefore, the control unit 25, when determining whether the feature portion of the comparison image information is consistent with the feature portion of the authentication image information, generates a comparison binary image representing the feature portion of the comparison image information (image in which the feature portion of the binary image is indicated as 1 and the others are indicated as 0) and an authentication binary image representing the feature portion of the authentication image information. Moreover, the control unit 25 determines whether or not the authentication binary image and the comparison binary image have identical portions or similar portions which are different in only the aspect ratio between them. As a result of the determination, if such portions are present in the images, then the control unit 25 determines that the feature portion of the comparison image information is consistent with the feature portion of the authentication image information. The control unit 25 performs the similar process as described above, in the case of comparing the comparison image information with the authentication image information as well. Specifically, the control unit 25 determines whether or not the authentication image information and the comparison image information have identical portions or similar portions which are different in only the aspect ratio between them. As a result of the determination, if such portions are present, then the control unit 25 determines that the comparison image information is consistent with the authentication image information.

Similarly, there may be a case where comparison information, i.e. comparison audio information acquired by recording authentication audio information in the communication device 30 is not exactly consistent with the authentication audio information, depending on audio pick-up conditions of the communication device 30 (e.g., a distance between the communication device 20 and the communication device 30, whether ambient noise is present or not). Therefore, the control unit 25, when comparing the feature portion of the authentication audio information with the feature portion of the comparison audio information, appropriately amplifies the feature portion of the comparison audio information and removes noise, and then performs the comparison of them. The similar is true for comparison of the authentication audio information and the comparison audio information.

1-3. Configuration of Slave Device

Figure 4:
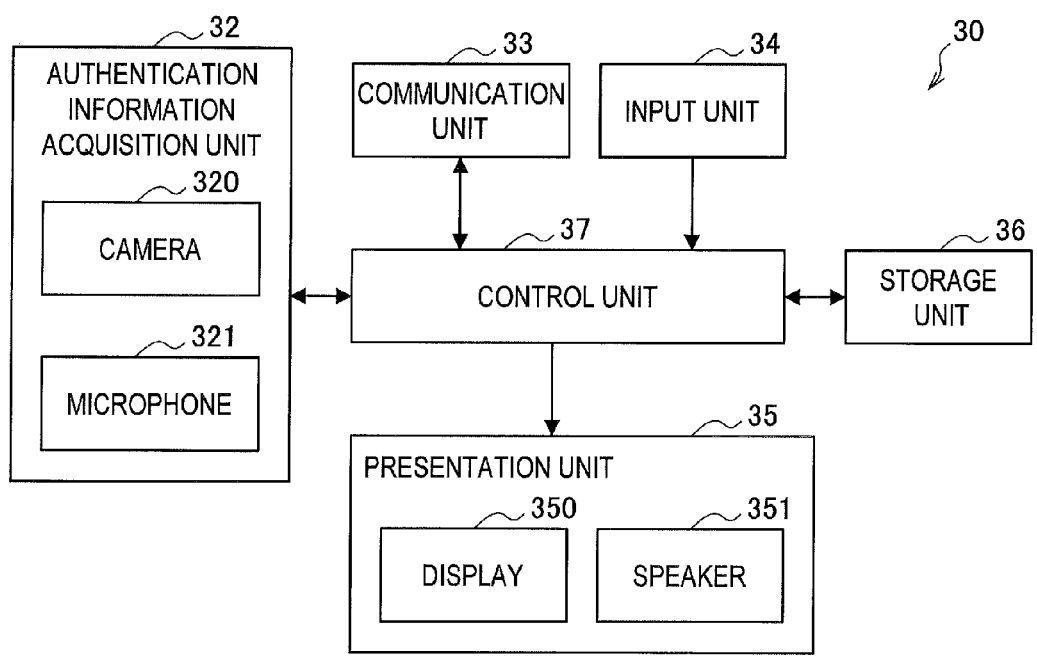
FIG. 4 is a block diagram showing the configuration of a communication device.

Next, the configuration of the communication device 30 acting as a slave device will be described with reference to FIG. 2 and FIG. 4. The communication device 30 is configured to include a main body 31, an authentication information acquisition unit 32, a communication unit 33, an input unit 34, a presentation unit 35, a storage unit 36, and a control unit 37.

The main body 31 contains the components of the communication device 30 therein, such as the communication unit 33, the storage unit 36, and the control unit 37. The authentication information acquisition unit 32 acquires authentication information presented by the communication device 20. Specifically, the authentication information acquisition unit 32 includes a camera 320 which acquires (captures) authentication image information and a microphone 321 which acquires (records) authentication audio information.

The camera 320 acquires comparison image information including the authentication image information by capturing the authentication image information. In this example, the comparison image information has two-dimensional coordinates and color information for each pixel. Positioning of an origin may be set arbitrarily. As an example, the origin may be any one of pixels forming outer edge portions of the comparison image information. The camera 320 provides the acquired comparison image information to the control unit 37.

The microphone 321 acquires comparison audio information including the authentication audio information by recording the authentication audio information. The microphone 321 provides the acquired comparison audio information to the control unit 37.

The communication unit 33 performs wireless communications with the communication device 20. The communication unit 33, when receiving a signal transmitted from the communication device 20, provides information included in the received signal to the control unit 37. Also, the communication unit 33 generates a signal including information provided from the control unit 37 and transmits the signal to the communication device 20.

The input unit 34 is a so-called touch panel and is provided on a surface of a display 350, which will be described later. The input unit 34 generates input operation information in response to a user's input operation and provides the generated information to the control unit 37.

The presentation unit 35 presents a variety of information to a user. More specifically, the presentation unit 35 includes a display 350 and a speaker 351. The display 350 displays a variety of image information, for example, the comparison image information as described above. The speaker 351 outputs various types of audio information, such as the comparison audio information as described above.

The storage unit 36 stores a program which is read out and executed by the control unit 37 as well as a variety of information necessary for processing by the communication device 30, for example, the comparison image information and the comparison audio information as described above.

The control unit 37 controls the components of the communication device 30. Also, the control unit 37 causes the storage unit 36 to store the comparison information provided from the authentication information acquisition unit 32.

1-4. Authentication Process of Communication System

Next, a procedure of an authentication process of the communication system will be described with reference to the flow charts in FIG. 5A and FIG. 5B. Further, in this example, an exemplary process in the case where the communication device 20 displays authentication image information as authentication information will be described, but a similar process can be performed also in the case where the communication device 20 outputs authentication audio information. In addition, it is assumed that the communication devices 20, 30 have recognized the presence of each other before the communication device 20 performs the process. The similar is true for each embodiment to be described later.

Figure 5A:
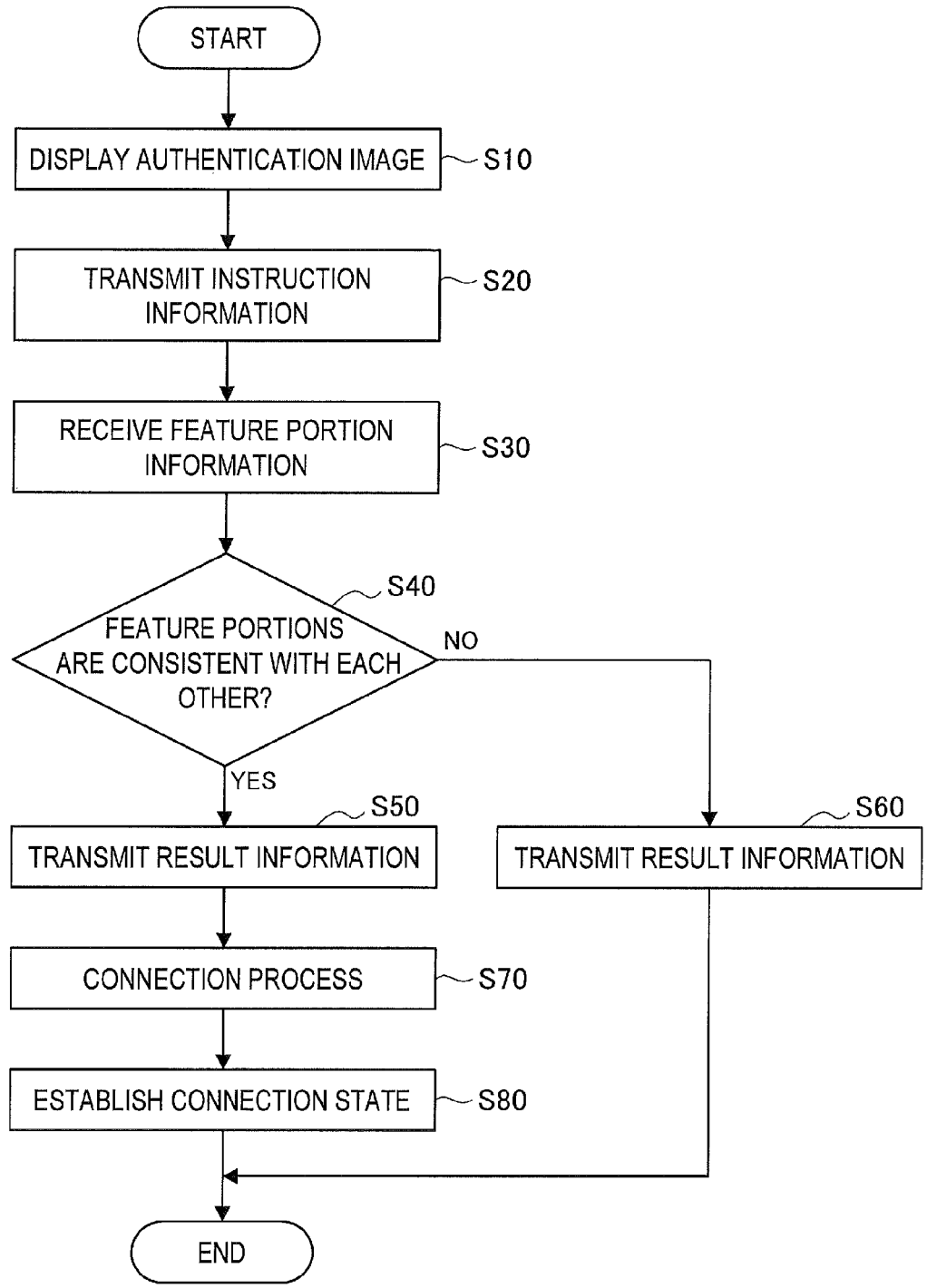
FIG. 5A is a flow chart showing the processing procedure in a communication system.
Figure 6:
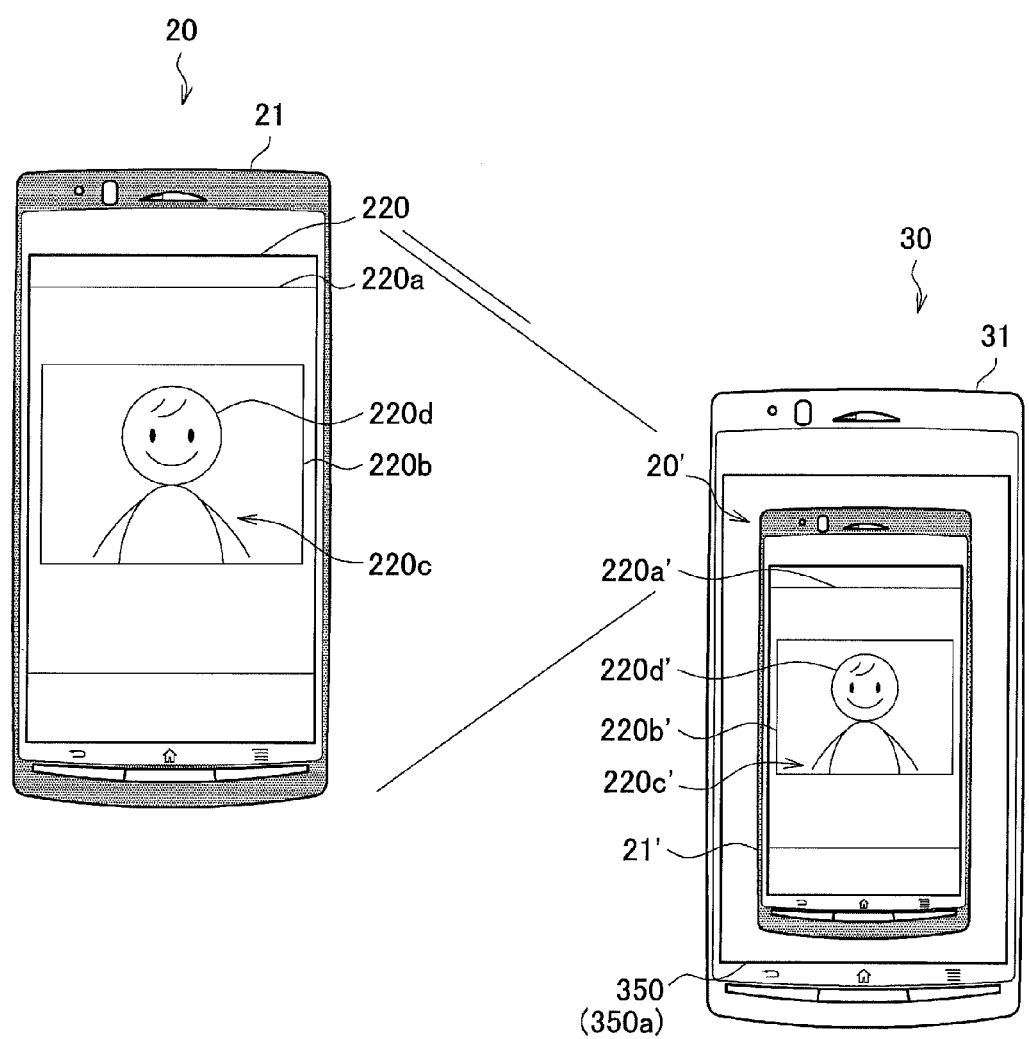
FIG. 6 is a diagram illustrating the processing state in a communication system.

In step S10 of FIG. 5A, the control unit 25 acquires the authentication image information from the storage unit 24 and causes the display 220 to display the authentication image information. This state is shown in FIG. 6. In FIG. 6, the communication device 20 displays authentication image information 220a. The authentication image information 220a contains a photographic image 220b. A person image 220c having a head portion image 220d is represented in the photographic image 220b. Furthermore, the control unit 25, when providing the authentication audio information as authentication information, acquires authentication audio information from the storage unit 24 and causes the speaker 221 to output the authentication audio information. Also, the control unit 25, when it uses the authentication image information representing the main body 21 as authentication information, may cause the display 220 to display the authentication image information. Alternately, the control unit 25 may proceed to step S20, rather than displaying the information.

In step S20, the control unit 25 acquires instruction information for instructing the acquisition of authentication image information (e.g., text information of "please capture the displayed image") from the storage unit 24 and provides the instruction information to the communication unit 23. The communication unit 23 generates an instruction signal including the instruction information and transmits the instruction signal to the communication device 30. Further, the control unit 25, when providing authentication audio information as authentication information, acquires instruction information for instructing the acquisition of the authentication audio information (e.g., text information of "please record the audio") from the storage unit 24 and provides the instruction information to the communication unit 23. Also, the control unit 25, when using image information representing the shape the main body 21 as the authentication image information, acquires instruction information for instructing the capturing of the main body 21 (e.g., a text information of "please capture the main body 21") from the storage unit 24 and provides the instruction information to the communication unit 23.

Meanwhile, in step S90 of FIG. 5B, the communication unit 33 of the communication device 30 receives the instruction signal and provides the instruction information included in the instruction signal to the control unit 37. The control unit 37 causes the display 350 to display the instruction information and causes the speaker 221 to output the instruction information. This allows the user of the communication device 30 to recognize that it is necessary to capture the authentication image information.

In addition, the control unit 37 activates the camera 320. The camera 320 acquires comparison image information by capturing an object containing authentication image information in response to a user's input operation. The camera 320 provides the acquired comparison image information to the control unit 37. The control unit 37 may cause the display 350 to display the comparison image information, as shown in FIG. 6. In the example shown in FIG. 6, comparison image information 350a is displayed on the display 350. The comparison image information 350a contains image information 20' representing the communication device 20. The image information 20' contains image information 21' representing the main body 21, image information 220a' representing the authentication image information 220a, and image information 220b' representing the photographic image 220b. The image information 220b' contains a person image 220c' representing a head portion 220d'.

Furthermore, when the instruction information indicates that the authentication audio information is to be acquired, the control unit 37 activates the speaker 351. The speaker 351 acquires comparison audio information by recording audio information including the authentication audio information and provides the comparison audio information to the control unit 37. The control unit 37 may cause the speaker 351 to output the comparison audio information.

Figure 7:
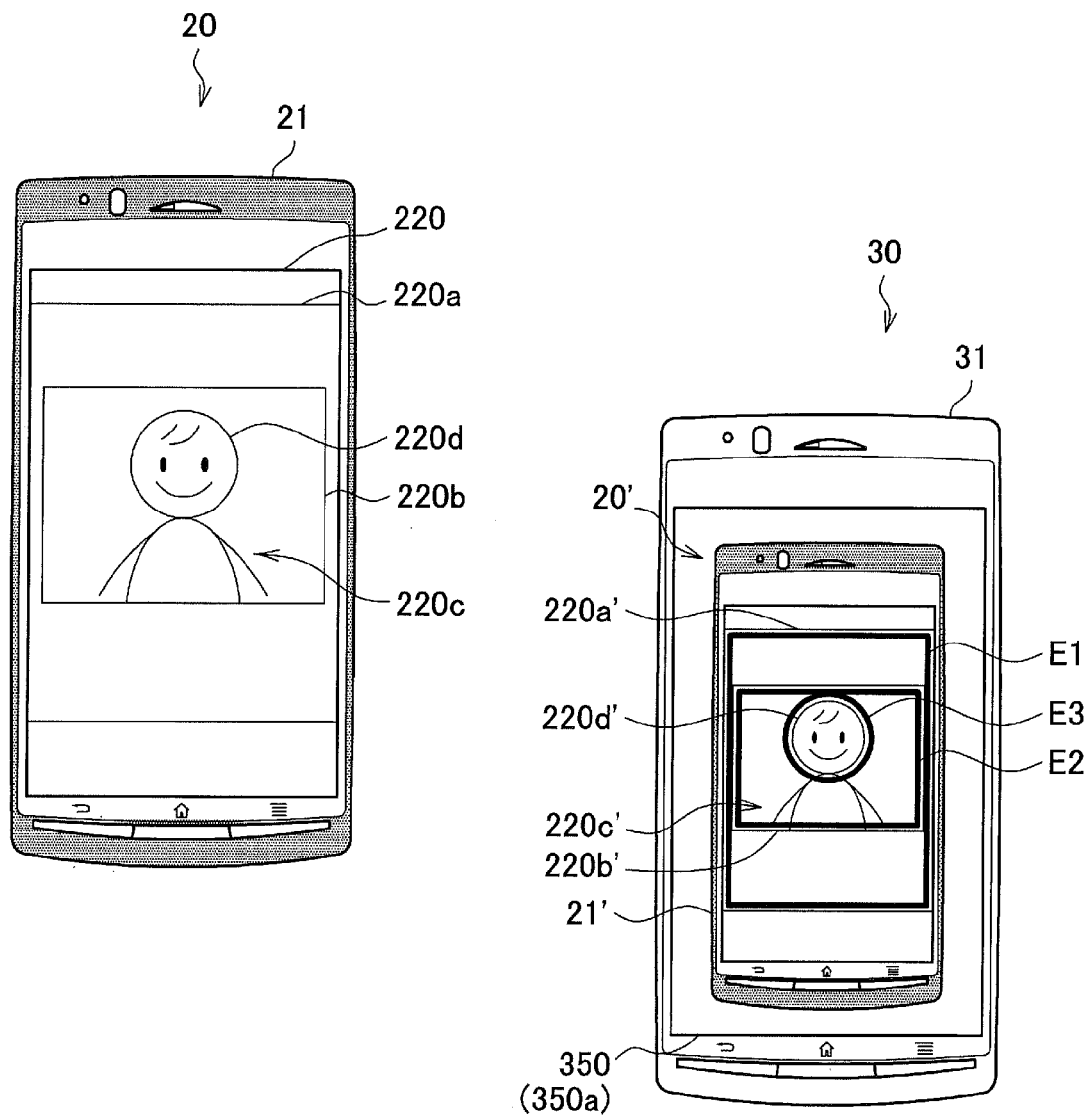
FIG. 7 is a diagram illustrating the processing state in a communication system.

Next, in step S100, the control unit 37 extracts a feature from the comparison image information (e.g., edge portion of the comparison image information). The control unit 37 may cause the display 350 to display the edge portion, as shown in FIG. 7. In the example shown in FIG. 7, edge portions E1 to E3 are displayed.

Figure 8:
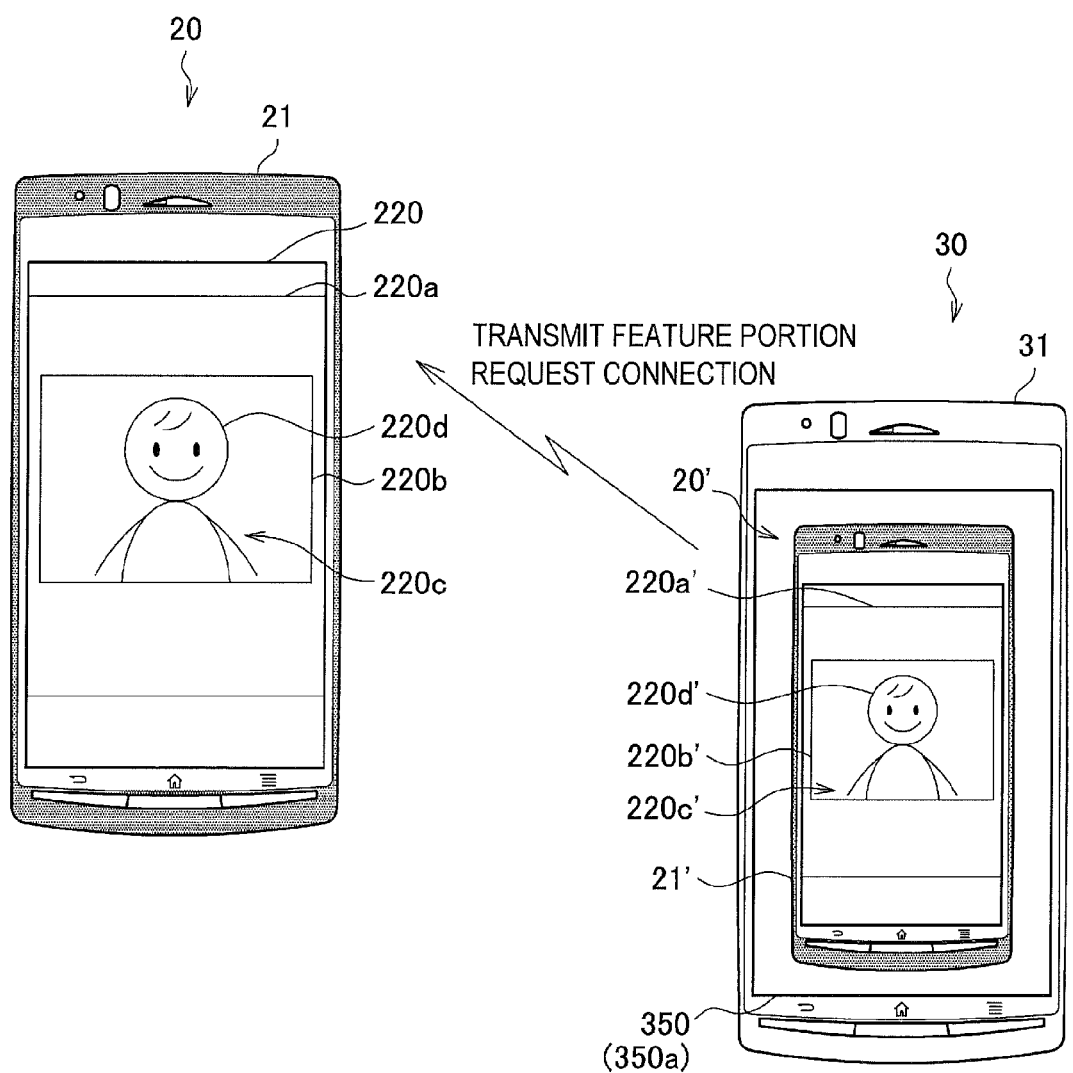
FIG. 8 is a diagram illustrating the processing state in a communication system.

In step S110, the control unit 37 generates feature portion information related to two-dimensional coordinates and color information of the edge portion and provides the feature portion information to the communication unit 33. The communication unit 33 generates a connection request signal including the feature portion information and transmits the connection request signal to the communication device 20, as shown in FIG. 8. The control unit 37 and the communication unit 33 perform similar processes for the comparison audio information as well. The feature portion of the comparison audio information may be a phase portion whose amplitude is larger than a predetermined value, as described above.

On the other hand, in step S30 of FIG. 5A, the communication unit 23 receives the connection request signal from the communication device 30 and transmits feature portion information included in the connection request signal to the control unit 25.

In step S40, the control unit 25 determines whether the feature portion of the comparison image information is consistent with the feature portion of the authentication image information, based on the feature portion information and the authentication image information. More specifically, the control unit 25 generates a comparison binary image representing the feature portion of the comparison image information and an authentication binary image representing the feature portion of the authentication image information. Then, the control unit 25 determines whether or not the authentication binary image and the comparison binary image have identical portions or similar portions which are different in only the aspect ratio between them. As a result of the determination, if such portions are present, then the control unit 25 determines that the feature portion of the comparison image information is consistent with the feature portion of the authentication image information. If such portions are not present, the control unit 25 determines that these feature portions are not consistent with each other. When it is determined that these feature portions are consistent with each other, the control unit 25 proceeds to step S50. On the other hand, when it is determined that these feature portions are not consistent with each other, the control unit 25 proceeds to step S60.

Furthermore, if the authentication information is authentication audio information, then the control unit 25 determines whether the feature portion of the comparison audio information is consistent with the feature portion of the authentication audio information based on the feature portion information and the authentication audio information. More specifically, the control unit 25 amplifies the feature portion of the comparison audio information and removes noise (e.g., a portion having different frequency from the authentication audio information). Then, the control unit 25 determines whether or not the authentication audio information and the comparison audio information have identical portions or similar portions which are different in only the amplitudes between them. As a result of the determination, if such portions are present, then the control unit 25 determines that the feature portion of the comparison audio information is consistent with the feature portion of the authentication audio information. If such portions are not present, then the control unit 25 determines that these feature portions are not consistent with each other. When it is determined that these feature portions are consistent with each other, the control unit 25 proceeds to step S50. Meanwhile, when it is determined that these feature portions are not consistent with each other, the control unit 25 proceeds to step S60.

Figure 9:
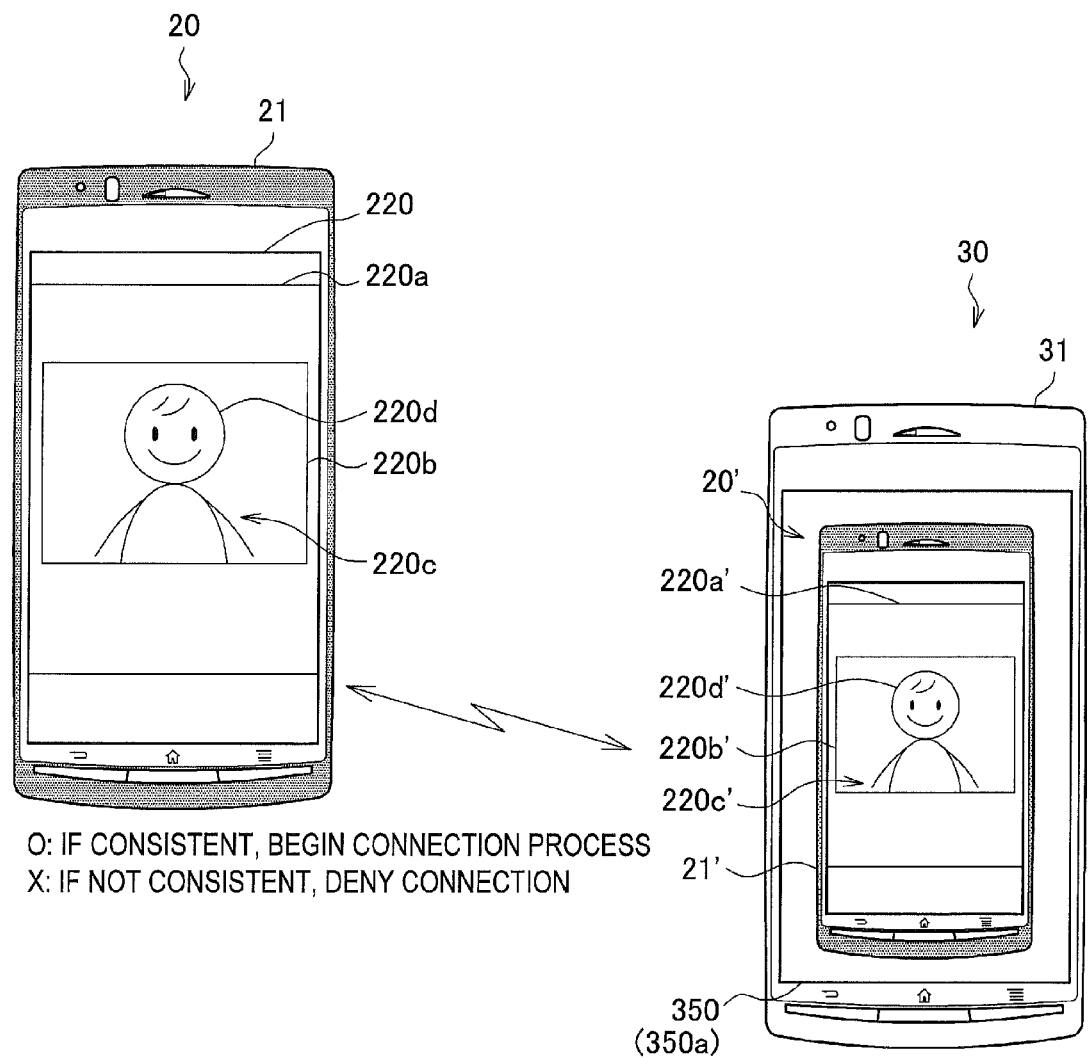
FIG. 9 is a diagram illustrating the processing state in a communication system.

In step S50, the control unit 25 authenticates the communication device 30 as an opposite communication party. The control unit 25 then generates connection permission information indicating that the authentication is normally done and provides the connection permission information to the communication unit 23. The communication unit 23 generates a connection permission signal including the connection permission information and transmits the connection permission signal to the communication device 30, as shown in FIG. 9.

In step S60, the control unit 25 does not authenticate the communication device 30 as an opposite communication party. More specifically, the control unit 25 denies the connection from the communication device 30. Then, the control unit 25 generates connection denial information indicating that the connection is denied and provides the connection denial information to the communication unit 23. The communication unit 23 generates a connection denial signal including the connection denial information and transmits the connection denial signal to the communication device 30, as shown in FIG. 9.

Meanwhile, in step S120 of FIG. 5B, the communication unit 33 of the communication device 30 receives the connection permission signal or the connection denial signal, and provides the connection permission information included in the connection permission signal or the connection denial information included in the connection denial signal to the control unit 37.

In step S130, the control unit 37 determines whether the connection is permitted or denied by communication device 20, based on the information provided from the communication unit 33. As a result of the determination, if it is determined that the connection is permitted by the communication device 20, then the control unit 37 proceeds to step S140, if it is determined that the connection is denied by the communication device 20, then the control unit 37 terminates the process.

Then, the communication devices 20, 30 perform predetermined connection processes and establish the connection, in steps S70, S80, S140, and S150. These processes are similar to known processes in the related art. For example, processes which are similar to that occurs when the WPS push button is pressed are performed.

Accordingly, in the communication system 10 according to the first embodiment, the user of the communication device 30 can obtain authentication from the communication device 20 by acquiring the authentication information presented by the communication device 20. Therefore, the communication system 10 can reduce the user's time and effort needed to perform the authentication process. Further, the communication system 10 performs the authentication process using the authentication information presented to the user, and thus the communication system can make it easy (intuitive) for the user to understand the authentication process. Moreover, the communication device 20 may select and present an appropriate one of the authentication image information and the authentication audio information depending on the surrounding situation. For example, the communication device 20 may be configured to detect ambient noise using the microphone. So, if a magnitude (amplitude) of the detected noise is larger than a predetermined value, then the communication device 20 may present the authentication image information. Meanwhile, the communication device 20 may be configured to present the authentication audio information, for example, when the communication device 30 does not have a camera (in this case, the communication device 20 receives the information indicating such situation from the communication device 30).

Furthermore, when the feature portion of the authentication information is consistent with the feature portion of the comparison information, because the communication device 20 authenticates the communication device 30 as an opposite party to be communicated, the communication device 20 can perform the more rapid authentication process than the direct comparison of the authentication information with the comparison information.

1-5. Modified Example

Figure 10:
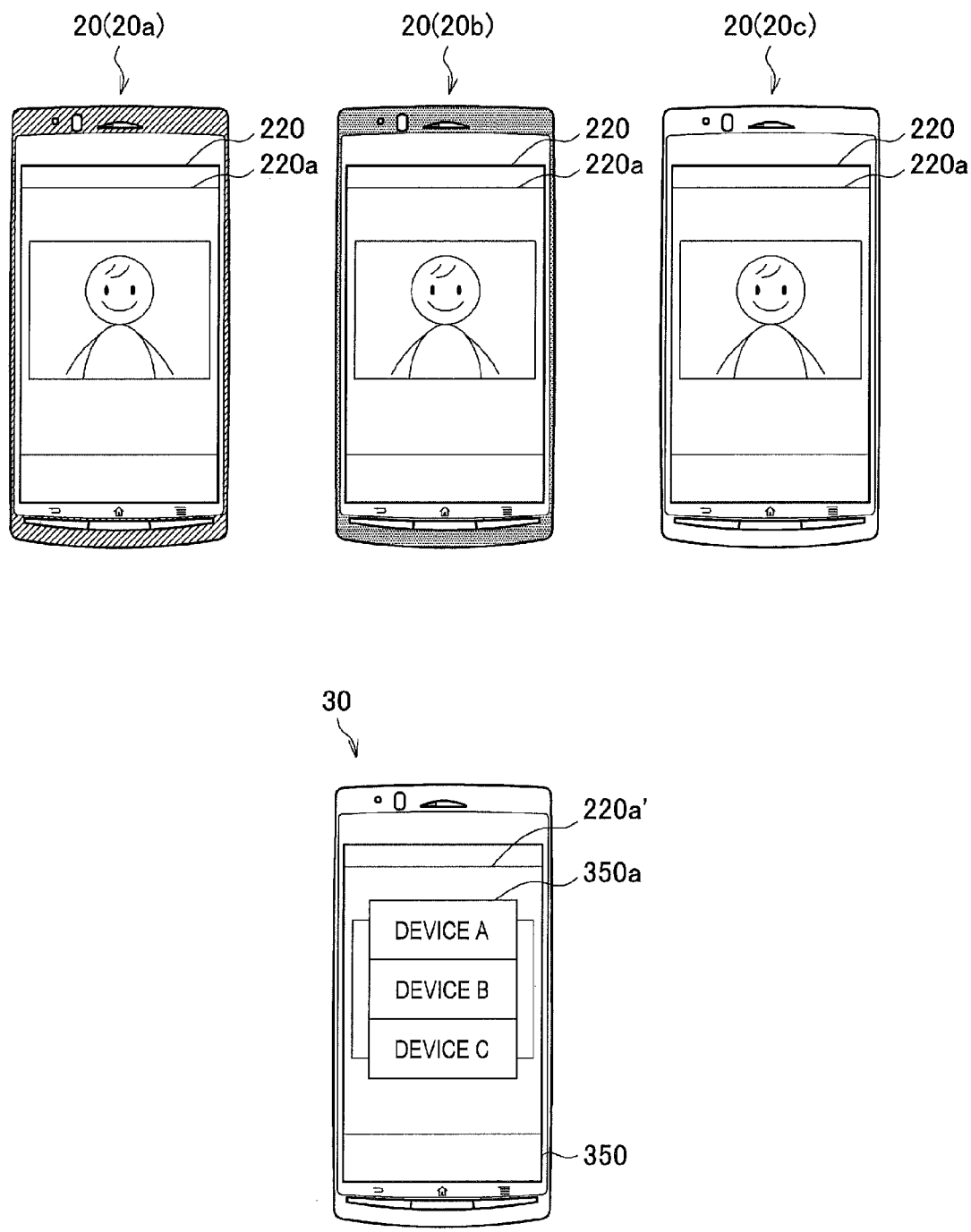
FIG. 10 is a diagram illustrating a modified example of the first embodiment.

Next, a modified example of the first embodiment will now be described with reference to FIG. 10. In the modified example, there is a plurality of communication devices 20 (20a-20c), which all presents the same authentication information (e.g., authentication image information 220a). In this case, each of the communication devices 20a-20c authenticates the communication device 30 as an opposite communication party. In other words, the communication device 30 receives each connection permission signal from the communication devices 20a-20c. In this regard, the control unit 37 creates a list of the communication devices 20a-20c from which the connection permission signal is transmitted and causes the display 350 to display the list. In the example shown in FIG. 10, a list 350a specifying the communication devices 20a-20c is displayed on the display 350. The user of the communication device 30 selects a desired communication device 20 by touching a portion indicating the desired communication device 20 among the communication devices 20 specified in the list 350a. The control unit 37 performs a connection process with the communication device 20 selected by user. With this modified example, the user can establish the connection of the desired communication device 20 to the communication device 30.

2. Second Embodiment

2-1. External Configuration of Communication System

Next, a second embodiment will now be described. First, the external configuration of a communication system 10-2 according to the second embodiment will be described with reference to FIG. 11. The communication system 10-2 includes a communication device 40 instead of the communication device 20 as a master device. The communication device 40 may be a communication device of a so-called television monitor type, and the communication device 40 includes a display 420 having a very large size compared to the display 350 of the communication device 30.

An overview of a process of the communication system 10-2 will be given. The communication device 30 acquires comparison image information by capturing authentication image information 420b of authentication image information 420a displayed on the display 420. The communication device 30 displays the comparison image information on the display 350. The communication device 350 extracts a feature portion from the comparison image information and generates feature portion information related to the feature portion. The communication device 30 transmits a connection request signal including the feature portion information to the communication device 40. The communication device 40 extracts a feature from the authentication image information and determines whether the feature portion of the comparison image information is included in the feature portion of the authentication image information. In other words, the communication device 40 determines whether the feature portion of the comparison image information is consistent with a part of the feature portion of the authentication image information. If it is determined that they are consistent with each other, then the communication device 40 authenticates the communication device as an opposite communication party and performs a connection process. Then, the user touches a desired portion of the comparison image information displayed on the display 350. The communication device 30 transmits a detailed information request signal associated with the touched portion to the communication device 40. The communication device 40 acquires relevant information which is associated with the portion touched by the user. The communication device 40 generates a relevant information notification signal including the relevant information and transmits the relevant information notification signal to the communication device 30. The communication device 30 displays the relevant information on the display 350.

2-2. Configuration of Master Device

Next, the detailed configuration of the communication device 40, which may be a master device, will be described with reference to FIG. 11 and FIG. 12. The communication device 40 includes a main body 41, an authentication information presentation unit 42, a communication unit 43, a storage unit 44, and a control unit 45.

The main body 41 contains the components of the communication device 40 therein, including the communication unit 43, the storage unit 44, and the control unit 45. The authentication information presentation unit 42 presents authentication information to the user of the communication device 30.

The authentication information presentation unit 42 includes a display 420 and a speaker 421. The display 420 presents authentication image information. An example of the authentication image information can include any image information representing a variety of objects such as human. The authentication image information has two-dimensional coordinates and color information (e.g., luminance) for each pixel. Also, each portion of the authentication image information is associated (matched) with a variety of information. In other words, the authentication image information has two-dimensional coordinates and color information for each pixel. Also, each portion of the authentication image information (set of a plurality of pixels) has its own key for a variety of information.

Figure 11:
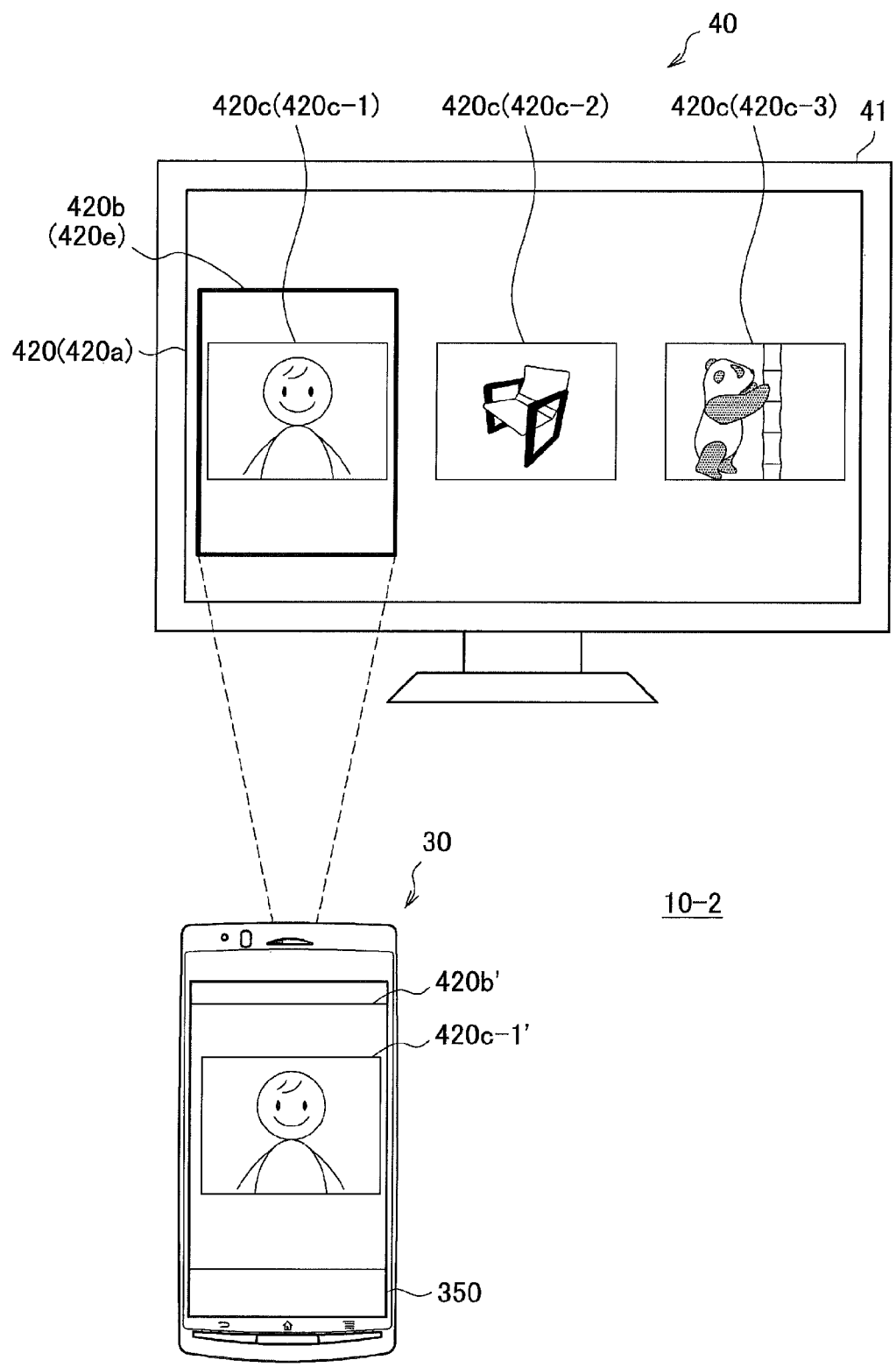
FIG. 11 is a diagram illustrating the configuration of a communication system in accordance with a second embodiment.
Figure 12:
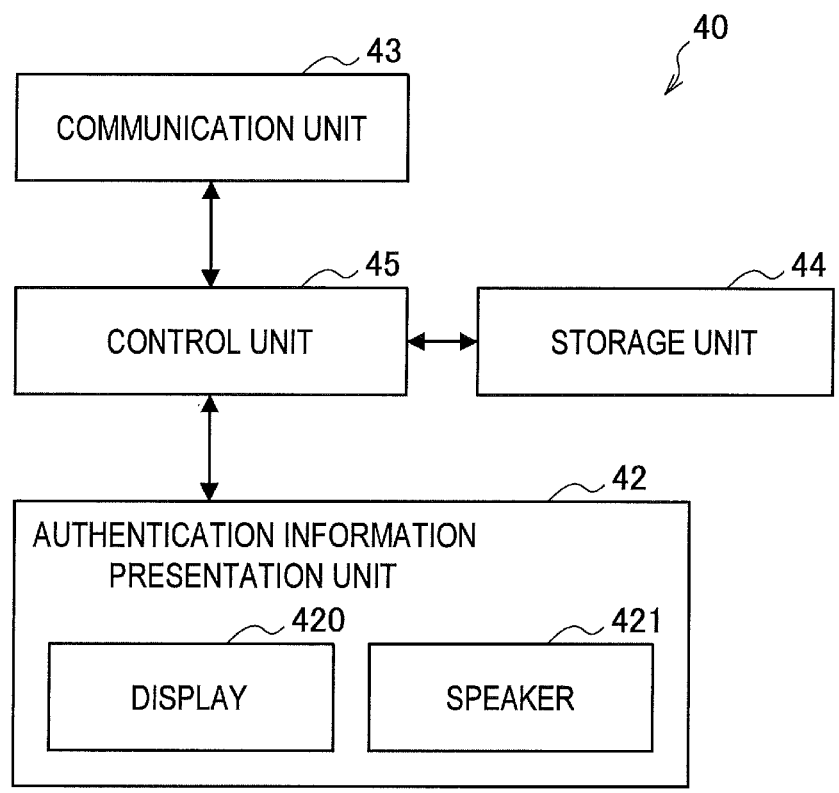
FIG. 12 is a block diagram showing the configuration of a communication device.

As an example, the authentication image information 420a shown in FIG. 11 contains a plurality of thumbnails of photographic image information 420c (420c-1-420c-3). Then, each of the thumbnails 420c is associated with URL, which represents the location stored with the photographic image information and detailed information (e.g., a photographer, the captured location, and the captured date and time) related to the photographic image information.

Meanwhile, the speaker 421 presents authentication audio information. An example of the authentication audio information can include music or the like.

The communication unit 43 performs wireless communication with the communication device 30. The communication unit 43, when receiving a signal transmitted from the communication device 30, provides information included in the received signal to the control unit 45. On the other hand, the communication unit 43 generates a signal including the information provided from the control unit 45 and provides the signal to the communication device 30.

The storage unit 44 stores a program which is read out and executed by the control unit 45 as well as a variety of information necessary for processing by the communication device 40, such as the authentication image information and authentication audio information as mentioned above. Further, the storage unit 44 stores the instruction information described above. Also, the storage unit 44 stores the information associated with each portion of the authentication image information, i.e. the relevant information.

The control unit 45 controls the components of the communication device 40 and also works as a determination unit and an authentication unit. Specifically, the control unit 45, when receiving feature portion information from the communication unit 43, determines whether the feature portion representing the feature portion information, i.e. the feature portion of comparison information is consistent with a part of the feature portion of the authentication information. When it is determined that they are consistent with each other, the control unit 45 authenticates the communication device 30 as an opposite communication party.

More specifically, the control unit 45, when determining that the feature portion of the comparison image information is consistent with a part of the feature portion of the authentication image information, generates a comparison binary image representing the feature portion of the comparison image information and an authentication binary image in which the feature portion of the authentication image information is represented. Then, the control unit 45 determines whether or not the comparison binary image and the authentication binary image have identical portions or similar portions which are different in only the aspect ratio between them. As a result of the determination, if such portions are present, then the control unit 45 determines that the feature portion of the comparison image information is consistent with a part of the feature portion of the authentication image information.

Furthermore, the control unit 45 may be configured to compare the comparison image information and a portion of the authentication image information. Also in this case, a similar process is carried out. Specifically, the control unit 45 determines whether a portion, which is identical to the comparison image information or different from the comparison image information only in the aspect ratio, is present in the authentication image information. As a result of the determination, if such portion is present, then control unit 45 determines that the comparison image information is consistent with a portion of the authentication image information. For the authentication audio information, the control unit 45 performs a process similar to that of the control unit 25 according to the first embodiment.

2-3. Process of Communication System

Next, a procedure of an authentication process of the communication system 10-2 will be described. The second embodiment and the first embodiment are only slightly different in the authentication process. Thus, the procedure of the authentication process will be described with reference to FIG. 5A and FIG. 5B.

In step S10 of FIG. 5A, the control unit 45 acquires authentication image information from the storage unit 44 and causes the display 420 to display the authentication image information. This state is shown in FIG. 11. In FIG. 11, the communication device 40 displays authentication image information 420a. The authentication image information 420a contains a plurality of thumbnails 420c.

In step S20, the control unit 45 acquires instruction information indicating that the authentication image information is to be acquired (e.g., text information of "please capture a desired one of the displayed images") from the storage unit 44 and provides the instruction information to the communication unit 43. The communication unit 43 generates an instruction signal including the instruction information and transmits the instruction signal to the communication device 30.

On the other hand, in step S90 of FIG. 5B, the communication unit 33 of the communication device 30 receives the instruction signal and provides the instruction information included in the instruction signal to the control unit 37. The control unit 37 causes the display 350 to display the instruction information and causes the speaker 221 to output the instruction information. This allows the user of the communication device 30 to recognize that it is necessary to capture the authentication image information.

In addition, the control unit 37 activates the camera 320. The camera 320 acquires comparison image information by capturing a portion of the authentication image information in response to a user's input operation. The camera 320 provides the acquired comparison image information to the control unit 37. The control unit 37 causes the display 350 to display the comparison image information as shown in FIG. 11. In the example shown in FIG. 11, comparison image information 420b' is displayed on the display 350. The comparison image information 420b' corresponds to a portion 420b of the authentication image information 420a. The comparison image information 420b' includes a thumbnail 420c-1'.

Then, in step S100, the control unit 37 extracts a feature from the comparison image information. The control unit 37 may cause the display 350 to display the feature portion.

In step S110, the control unit 37 generates feature portion information related to two-dimensional coordinates and color information of an edge portion and provides the feature portion information to the communication unit 33. The communication unit 33 generates a connection request signal including the feature portion information and transmits the connection request signal to the communication device 40.

Meanwhile, in step S30 of FIG. 5A, the communication unit 43 receives the connection request signal from the communication device 30 and provides the feature portion information included in the connection request signal to the control unit 45.

In step S40, the control unit 45 determines whether the feature portion of the comparison image information is consistent with a part of the feature portion of the authentication image information, based on the feature portion information and authentication image information. When it is determined that the feature portion of the comparison image information is consistent with a part of the feature portion of the authentication image information, the control unit 45 proceeds to step S50. On the other hand, when it is determined that they are not consistent with each other, the control unit 45 proceeds to step S60.

In step S50, the control unit 45 presents a portion of the authentication image information which is determined to be consistent with the comparison image information, i.e. the captured portion. For example, the control unit 45 generates frame image information 420e representing the captured portion and causes the display 420 to display the frame image information, as shown in FIG. 11. Further, the control unit 45 authenticates the communication device 30 as an opposite communication party. Then, the control unit 45 generates connection permission information indicating that the authentication is normally done and provides the connection permission information to the communication unit 43. The communication unit 43 generates a connection permission signal including the connection permission information and transmits the connection permission signal to the communication device 30.

In step S60, the control unit 45 does not authenticate the communication device 30 as an opposite communication party. Specifically, the control unit 45 denies the connection to the communication device 30. Then, the control unit 45 generates connection denial information indicating that the connection is denied and provides the connection denial information to the communication unit 43. The communication unit 43 generates a connection denial signal including the connection denial information and transmits the connection denial signal to the communication device 30.

Meanwhile, in step S120 of FIG. 5B, the communication unit 33 of the communication device 30 receives the connection permission signal or the connection denial signal and transmits the connection permission information included in the connection permission signal or the connection denial information included in the connection denial signal to the control unit 37.

In step S130, the control unit 37 determines whether the connection is permitted or denied by communication device 20, based on the information provided from the communication unit 33. As a result of the determination, if it is determined that the connection is permitted by the communication device 20, then the control unit 37 proceeds to step S140, if it is determined that the connection is denied by the communication device 20, then the control unit 37 terminates the process.

Then, the communication devices 20, 30 perform predetermined connection processes and establish the connection in steps S70, S80, S140, and S150.

Then, a user touches a desired portion of the comparison image information displayed on the display 350. For example, according to the example shown in FIG. 11, the user touches a thumbnail 420c-1'. The input unit 34 provides input operation information to the control unit 37. The control unit 37 recognizes a portion selected (touched) by the user based on the input operation information and provides selected portion information related to the selected portion to the communication unit 33. The communication unit 33 generates a relevant information request signal including the selected portion information and transmits the relevant information request signal to the communication device 40.

The communication unit 43 of the communication device 40 receives the relevant information request signal and provides the selected portion information included in the relevant information request signal to the control unit 45. The control unit 45 specifies a portion selected by the user from among each portion of the authentication image information based on the selected portion information. Further, the control unit 45 acquires information associated with the specified portion, i.e. relevant information by following the keys including the specified portion. In an example shown in FIG. 11, the control unit 45 acquires a URL associated with a thumbnail 420c-1. The control unit 45 provides the acquired relevant information to the communication unit 43. The communication unit 43 generates a relevant information notification signal including the relevant information and transmits the relevant information notification signal to the communication device 30.

Figure 13:
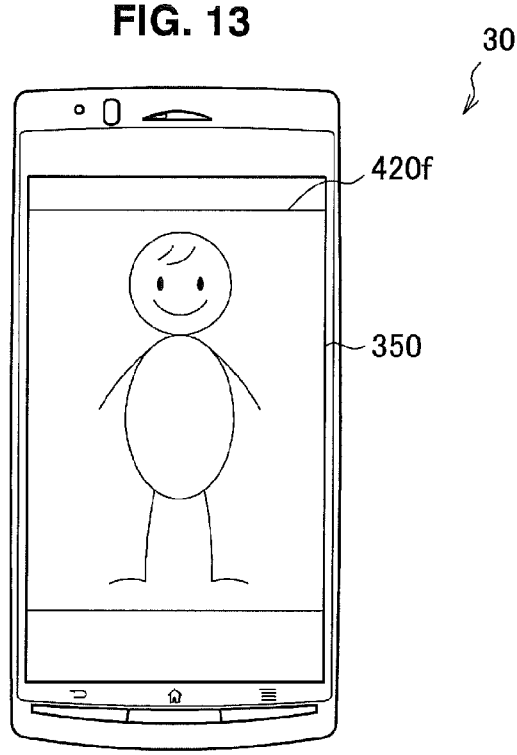
FIG. 13 is a diagram illustrating an example of an image displayed on a display of a communication device.
Figure 14:
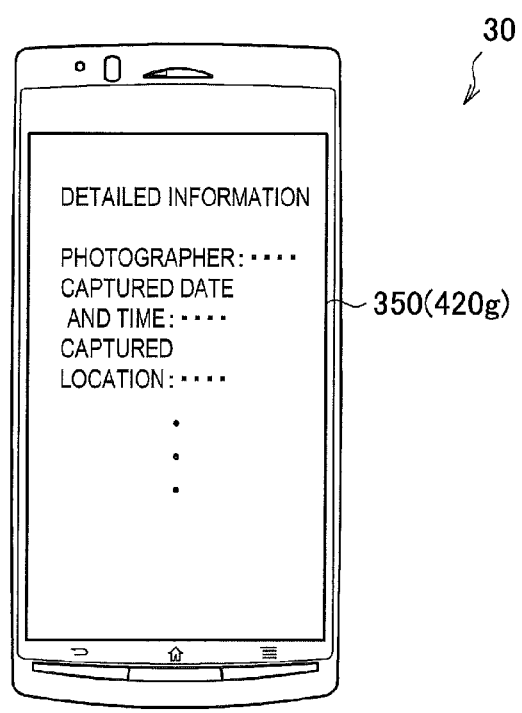
FIG. 14 is a diagram illustrating an example of an image displayed on a display of a communication device.

The communication unit 33 of the communication device 30 provides the relevant information included in the relevant information notification signal to the control unit 37. The control unit 37 performs a variety of processes based on the relevant information. For example, according to the example shown in FIG. 11, the control unit 37 acquires a URL of photographic image information and detailed information, and thus it accesses the URL through a network (not shown). Therefore, the control unit 37 causes the display 350 to display photographic image information 420f corresponding to the thumbnail 420c-1 as shown in FIG. 13. Moreover, the control unit 37 causes the display 350 to display the detailed information (e.g., a photographer, captured location, and captured date and time of the photographic image information 420f) as image information 420g as shown in FIG. 14. In addition, the detailed information may be provided as audio information.

Accordingly, in the communication system 10-2 according to the second embodiment, the user of the communication device 30 can obtain authentication from the communication device 40 by acquiring (capturing) a portion of the authentication information presented by the communication device 40. Thus, the communication system 10-2 can reduce the user's time and effort needed to perform the authentication process. Further, the communication system 10-2 performs the authentication process using the authentication information presented to the user, and thus the communication system can make it easy for the user to understand the authentication process. Moreover, in the communication system 10-2, a variety of information is associated with each portion of the authentication image information, and thus the user can acquire the information by touching a desired portion of the comparison image information displayed on the display 350. Therefore, the user can easily acquire desired relevant information from among the relevant information which is associated with each portion of the authentication image information.

3. Third Embodiment

3-1. External Configuration of Communication System

Next, a third embodiment will be described. First, the external configuration of a communication system 10-3 according to the third embodiment will be described with reference to FIG. 15. The communication system 10-3 includes a communication device 50 instead of the communication device 20 as a master device. The communication device 50 may be a communication device of a so-called television monitor type, and the communication device 50 includes a display 520 having a very large size compared to the display 350 of the communication device 30.

In the communication system 10-3, the following process is carried out. Specifically, the communication device 50 displays a plurality of pieces of authentication image information 520b (520b-1~520b-6). Further, a standard acquisition sequence, which may be an order to be acquired by the communication device 30, is set in the authentication image information 520b. The authentication image information 520b includes numeric image information 520c (520c-1~520c-6). Also, the communication device 50 highlights authentication image information 520b ($n^{th}$ authentication image information 520b) which is to be now acquired by the communication device 30 from among these authentication image information 520b.

The communication device 30 acquires comparison image information by capturing the $n^{th}$ authentication image information 520b from among the authentication image information 520b displayed on the display 520. The communication device 30 displays the comparison image information on the display 350. The communication device 30 extracts a feature portion from the comparison image information and generates feature portion information associated with the feature portion. The communication device transmits a connection request signal containing the feature portion information to the communication device 40.

The communication device 50 extracts a feature from the $n^{th}$ authentication image information and determines whether the feature portion of the $n^{th}$ authentication image information is consistent with the feature portion of the comparison image information. If they are consistent with each other, then the communication device 50 performs a similar process as described above for $(n+1)^{th}$ authentication image information. When it is determined that each of all the authentication image information 520b is consistent with the comparison image information, the communication device 50 authenticates the communication device 30 as an opposite communication party and performs the connection process.

In other words, when the communication device 50 determines that each of the plurality of authentication image information 520b is consistent with the comparison image information and the communication device 30 acquires the plurality of authentication image information 520b in the order of the standard acquisition sequence, the communication device 50 authenticates the communication device 30 as an opposite communication party.

3-2. Configuration of Master Device

Next, the detailed configuration of the communication device 50, which may be a master device, will be described with reference to FIG. 15 and FIG. 16. The communication device 50 includes a main body 51, an authentication information presentation unit 52, a communication unit 53, a storage unit 54, and a control unit 55.

The main body 51 contains the components of the communication device 50, for example, the communication unit 53, the storage unit 54 and the control unit 55. The authentication information presentation unit 52 presents authentication information to the user of the communication device 30.

The authentication information presentation unit 52 includes a display 520 and a speaker 521. The display 520 presents a plurality of pieces of authentication image information. An example of the authentication image information can include any image information representing a variety of objects such as human. The authentication image information each has two-dimensional coordinates and color information (e.g., luminance) for each pixel. Also, each of the authentication image information has numerical image information indicating a standard acquisition sequence (an integer of 1 or more).

Figure 15:
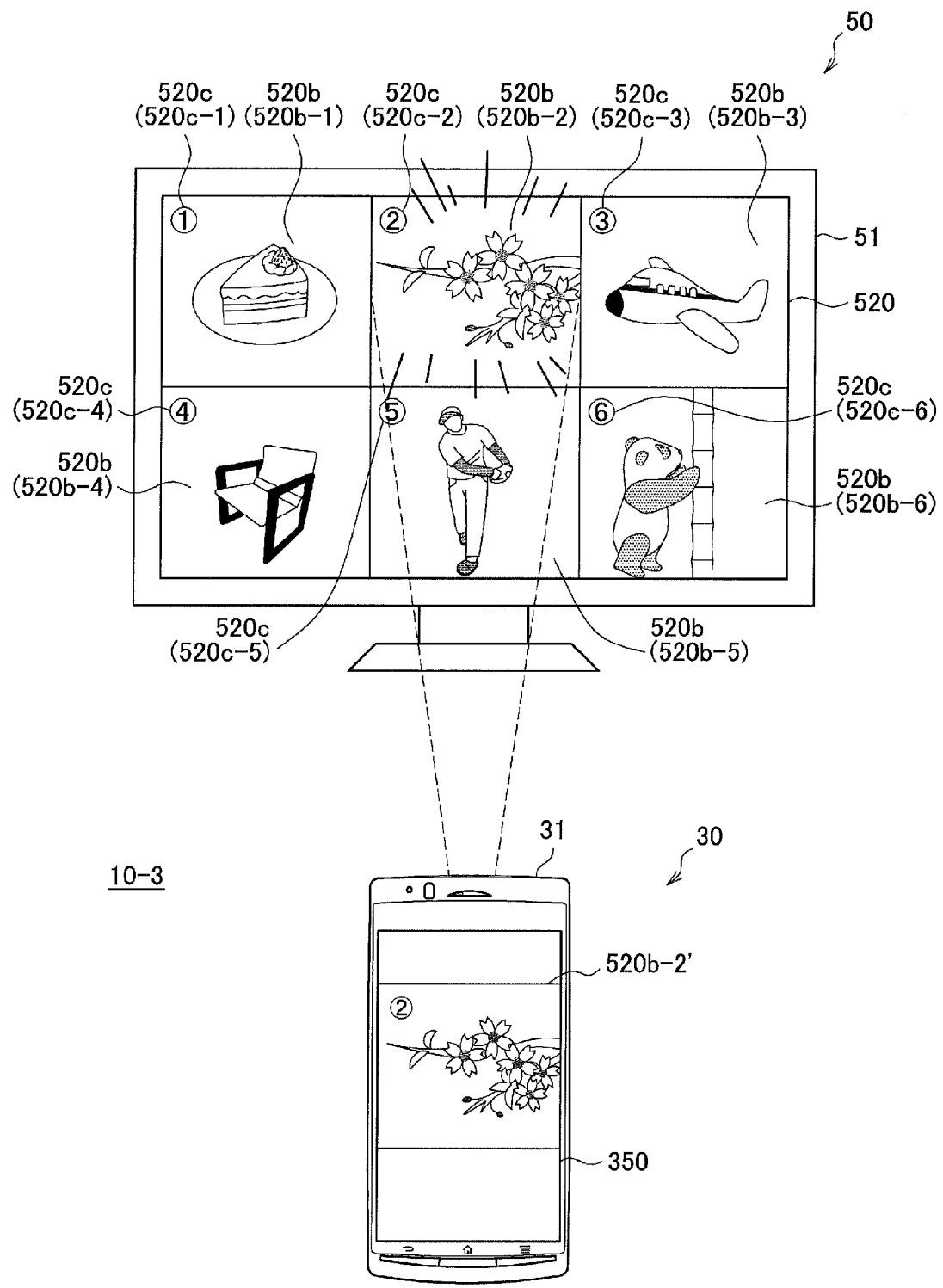
FIG. 15 is a diagram illustrating the configuration of a communication system in accordance with a third embodiment.
Figure 16:
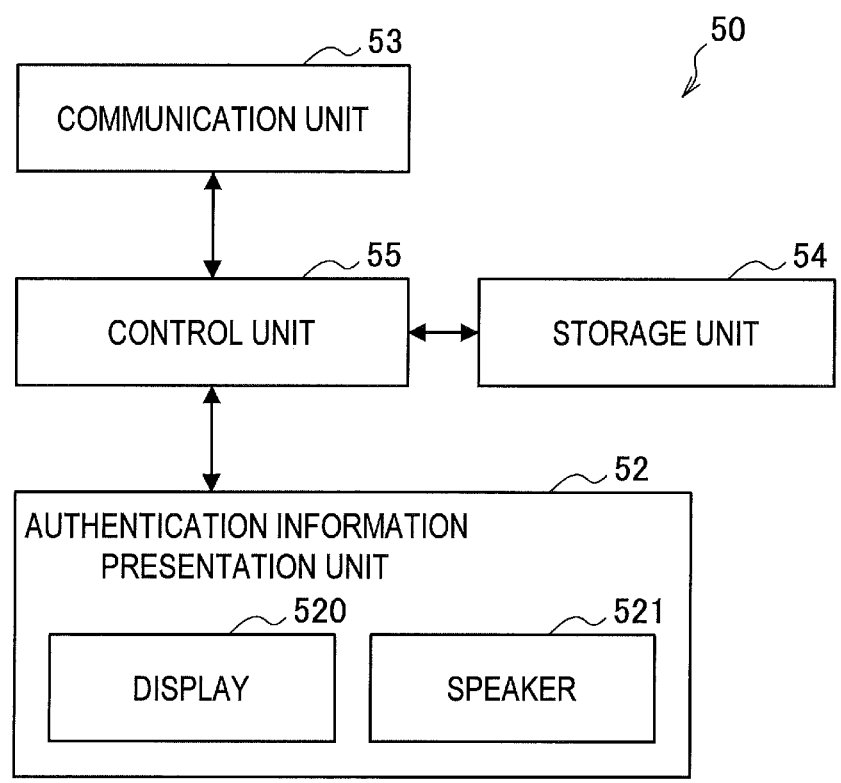
FIG. 16 is a block diagram showing the configuration of a communication device.

For example, characters "1" to "6" as the numerical image information are represented on each of the authentication image information 520b, as shown in FIG. 15. Thus, the user of the communication device 30 can capture the authentication image information 520b in sequence from the authentication image information 520b-1 at the upper left-hand side of the display.

Meanwhile, the speaker 521 presents authentication audio information. An example of the authentication audio information can include music or the like.

The communication unit 53 performs wireless communication with the communication device 30. The communication unit 53, when receiving a signal transmitted from the communication device 30, provides information included in the received signal to the control unit 55. On the other hand, the communication unit 53 generates a signal including the information provided from the control unit 55 and provides the signal to the communication device 30.

The storage unit 54 stores a program which is read out and executed by the control unit 55 as well as a variety of information necessary for processing by the communication device 50, such as the authentication image information and authentication audio information as mentioned above. Further, the storage unit 54 stores the instruction information described above or a capturing order counter n.

The control unit 55 controls the components of the communication device 50 and also works as a determination unit and an authentication unit. More specifically, the control unit 55, when it receives feature portion information from the communication unit 53, determines whether a feature representing the feature portion information, i.e. a feature portion of the comparison image information is consistent with a feature portion of the $n^{th}$ authentication image information. Then, when it is determined that each of the plurality of authentication image information is consistent with the comparison image information and the communication device 30 acquires the plurality of authentication image information in the order of the standard acquisition sequence, the control unit 55 authenticates the communication device 30 as an opposite communication party. Moreover, the method for determining whether the feature portion of the comparison information is consistent with the feature portion of the $n^{th}$ authentication information is similar to that of the first embodiment.

Further, the control unit 55 may be configured to compare the comparison image information and the $n^{th}$ authentication image information. In this case, a similar process is carried out. For authentication audio information, the control unit 55 performs a process similar to that of the control unit 25 according to the first embodiment.

3-3. Process of Communication System

Next, the procedure of an authentication process of the communication system 10-2 will be described with reference to FIG. 17A and FIG. 17B.

Figure 17A:
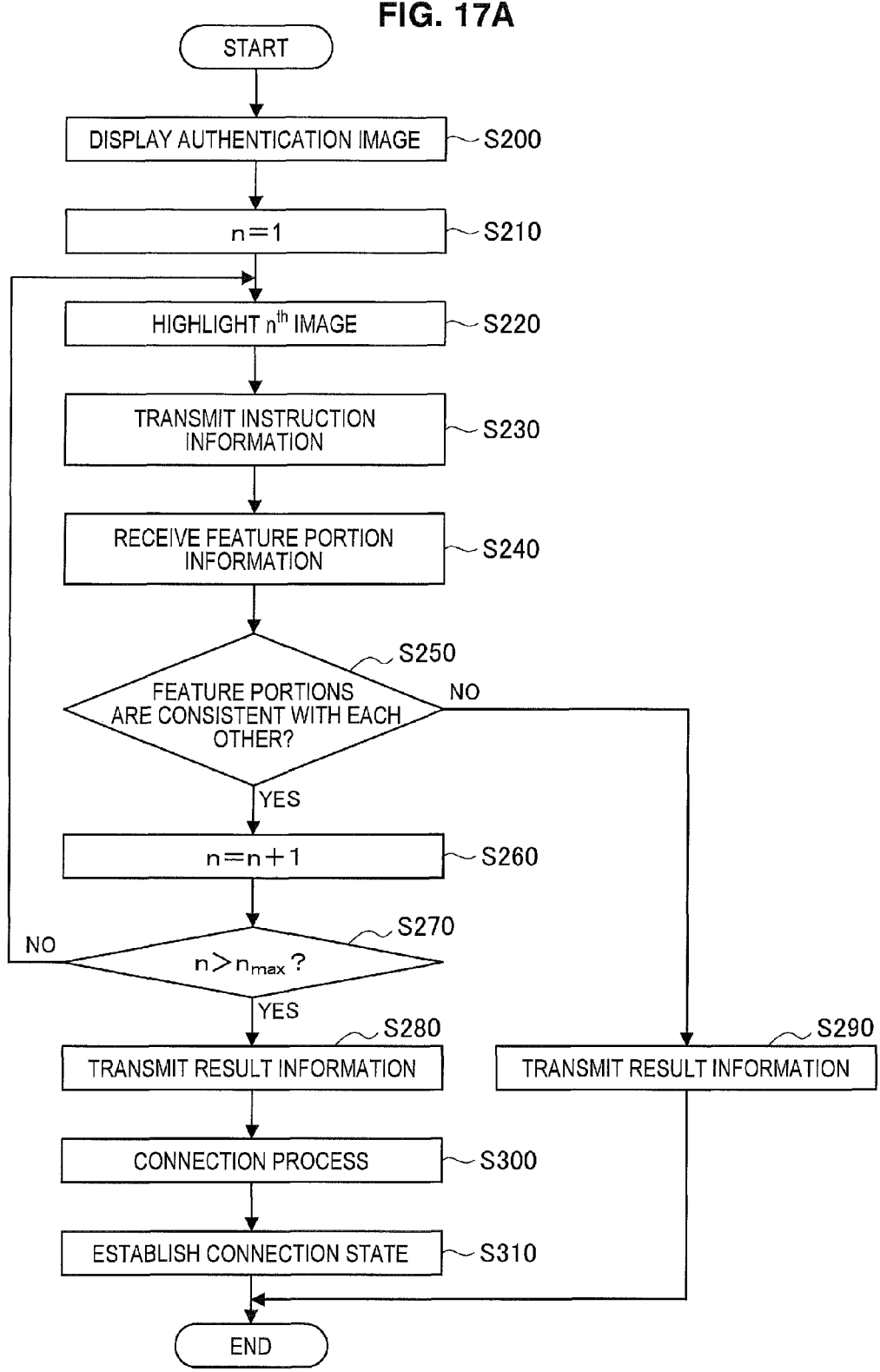
FIG. 17A is a flow chart showing the processing procedure in a communication system.

In step S200 of FIG. 17A, the control unit 55 acquires a plurality of pieces of authentication image information from the storage unit 45 and causes the display 520 to display the authentication image information. This state is shown in FIG. 15. In FIG. 15, the communication device 50 displays a plurality of pieces of authentication image information 520b.

In step S210, the control unit 55 sets the value of the capturing order counter n to 1. In step S220, the control unit 55 causes the display 520 to highlight the $n^{th}$ authentication image information. For example, in FIG. 15, the second authentication image information 520b-2 is highlighted.

In step S230, the control unit 55 acquires instruction information (e.g., text information of "please capture the $n^{th}$ image of the displayed images) for instructing the acquisition (capturing) of the $n^{th}$ authentication image information from the storage unit 54 and transmits the instruction information to the communication unit 53. The communication unit 53 generates an instruction signal including the instruction information and transmits the instruction signal to the communication device 30.

Figure 17B:
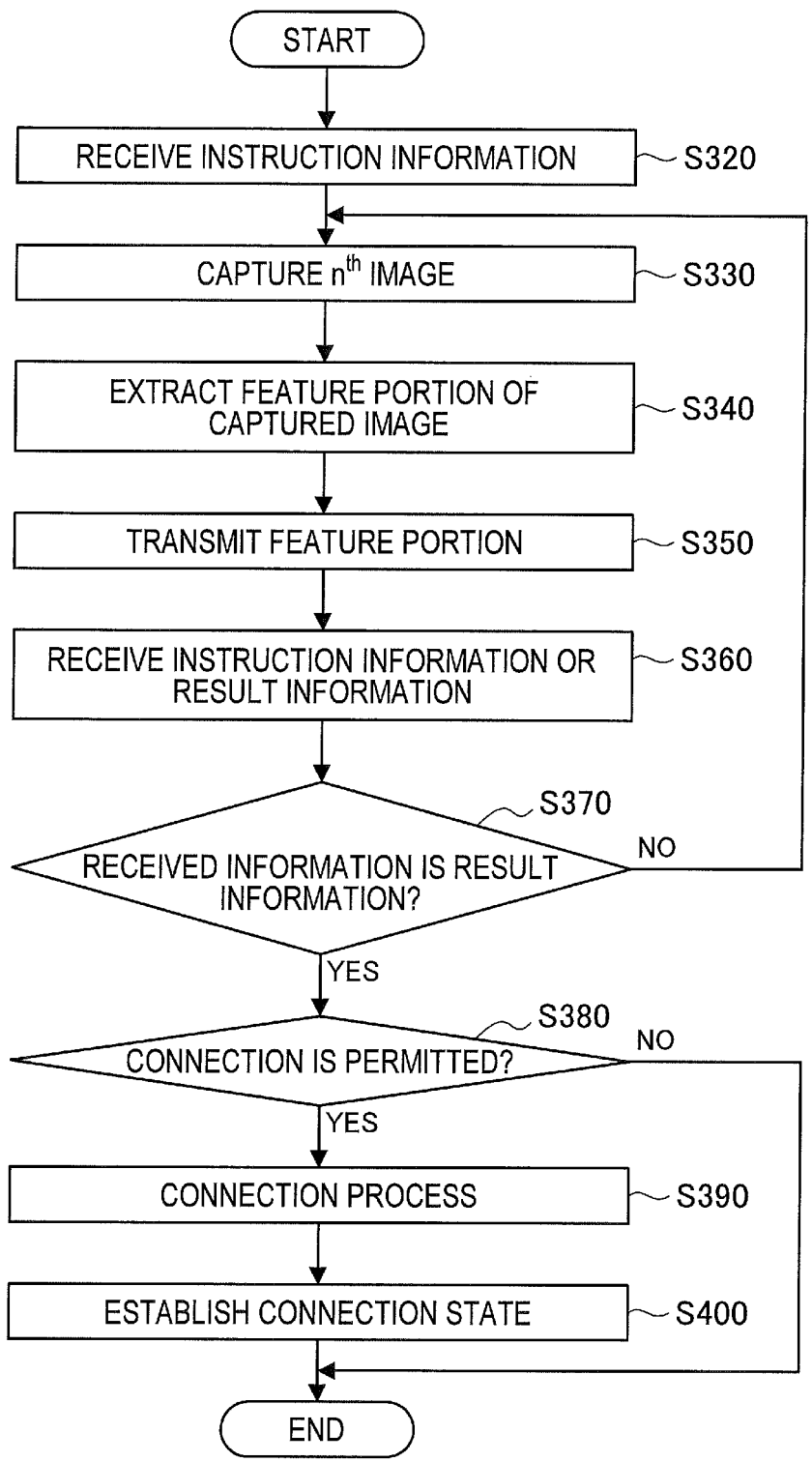
FIG. 17B is a flow chart showing the processing procedure in a communication system.

Meanwhile, in step S320 of FIG. 17B, the communication unit 33 of the communication device 30 receives the instruction signal and provides the instruction information included in the instruction signal to the control unit 37.

In step S330, the control unit 37 causes the display 350 to display the instruction information and causes the speaker 221 to output the instruction information. This allows the user of the communication device 30 to recognize that it is necessary to capture the $n^{th}$ authentication image information.

Meanwhile, the control unit 37 activates the camera 320. The camera 320 acquires comparison image information by capturing the $n^{th}$ authentication image information in response to a user's input operation. The camera 320 outputs the acquired comparison image information to the control unit 37. The control unit 37 causes the display 350 to display the comparison image information as shown in FIG. 15. In the example shown in FIG. 15, comparison image information 520b-2' is displayed on the display 350. The comparison image information 520b-2' corresponds to the second authentication image information 520b-2.

Next, in step S340, the control unit 37 extracts feature from the comparison image information. The control unit 37 may be configured to cause the display 350 to display the feature portion.

In step S350, the control unit 37 generates feature portion information related to two-dimensional coordinates and color information of an edge portion and provides the feature portion information to the communication unit 33. The communication unit 33 generates a connection request signal including the feature portion information and transmits the connection request signal to the communication device 50.

Meanwhile, in step S240 of FIG. 17A, the communication unit 53 receives the connection request signal from the communication device 30, and provides the feature portion information included in the connection request signal to the control unit 55.

In step S250, the control unit 55 determines whether the feature portion of the comparison image information and the feature portion of the $n^{th}$ authentication image information are consistent with each other, based on the feature portion information and the $n^{th}$ authentication image information. If it is determined that the feature portion of the comparison image information and a part of the feature portion of the $n^{th}$ authentication image information are consistent with each other, then the control unit 55 proceeds to step S260. If it is determined that they are not consistent with each other, then the control unit 55 proceeds to step S290.

In step S260, the control unit 55 increments the value of the capturing order counter n by 1. In step S270, the control unit 55 determines whether the value of the capturing order counter n exceeds the maximum value $n_{max}$. If it is determined that the value of the capturing order counter n exceeds the maximum value $n_{max}$, then the control unit 55 proceeds to step S280. If it is determined that the value of the capturing order counter n is not greater than the maximum value $n_{max}$, then the control unit 55 returns to step S220. Thus, as the maximum value $n_{max}$ increases, the number of the authentication image information which is to be captured by user is increased accordingly, thereby improving the communication security. For example, the maximum value $n_{max}$ is 6.

In step S280, the control unit 55 authenticates the communication device 30 as an opposite communication party. Then, the control unit 55 generates connection permission information indicating that the authentication is normally done and provides the connection permission information to the communication unit 53. The communication unit 53 generates a connection permission signal including the connection permission information and transmits the connection permission signal to the communication device 30.

In step S290, the control unit 55 fails to authenticate the communication device 30 as an opposite communication party. In other words, the control unit 55 denies the connection to the communication device 30. Then, the control unit 55 generates connection denial information indicating that the connection is denied and provides the connection denial information to the communication unit 53. The communication unit 53 generates a connection denial signal including the connection denial information and transmits the connection denial signal to the communication device 30.

Meanwhile, in step S360 of FIG. 17B, the communication unit 33 of the communication device 30 receives the instruction information, the connection permission signal or the connection denial signal, and provides the information included in these signals to the control unit 37.

In step S370, the control unit 37 determines whether information provided from the communication unit 33 is one of the connection permission information and the connection denial information as result information. If it is determined that information provided from the communication unit 33 is the result information, then the control unit 37 proceeds to step S380. If the control unit 37 determines that the information provided from the communication unit 33 is the instruction information, then it returns to step S330.

In step S380, the control unit 37 determines whether or not the communication device 50 permits the connection, based on the information provide from the communication unit 33. As a result, if it is determined that the communication device 50 permits the connection, then the control unit 37 proceeds to step S390. If it is determined that the communication device 50 denies the connection, then the control unit 37 terminates the authentication process.

Then, the communication devices 30, 50 perform predetermined connection processes and establish the connection in steps S300, S310, S390, and S400.

Therefore, in the communication system 10-3 according to the third embodiment, if it is determined that each of the plurality of pieces of authentication image information is consistent with the comparison image information, then the communication device 50 authenticates the communication device 30 as an opposite communication party, and thus the communication security can be improved.

In particular, when it is determined that each of the plurality of pieces of authentication image information is consistent with the comparison image information and the communication device 30 acquires the plurality of pieces of authentication image information in the order of the standard acquisition sequence, the communication device 50 authenticates the communication device 30 as an opposite communication party, so the communication security can be further improved.

While the preferred embodiments of the present disclosure have been described above with reference to the accompanying drawings, the technical scope of the present disclosure is not limited to the above examples. Various alternations and modifications of this disclosure will become apparent to those skilled in the art within the scope and principles of this disclosure and it should be understood that they will naturally come under the technical scope of the present disclosure.

For example, although the second and third embodiments above have been described relating to the process for authentication image information, a similar process likewise applicable to the authentication audio information. Also, the first to third embodiments may optionally be combined between them. For example, the control unit 25 of the first embodiment may be configured to have the function of the control unit 45 of the second embodiment. Similarly, the control unit 25 of the first embodiment may be configured to have the function of the control unit 55 of the second embodiment. Similarly, the control unit 45 of the second embodiment may be configured to have the function of the control unit 55 of the third embodiment.

Additionally, the present technology may also be configured as below.

(1) A communication device comprising:
a determination unit for determining whether authentication information presented to a user of another communication device is consistent with comparison information transmitted from the other communication device capable of obtaining and transmitting the authentication information; and an authentication unit, when it is determined that the authentication information is consistent with the comparison information, for authenticating the other communication device as an opposite communication party.

(2) The communication device according to (1), wherein the authentication information is a plurality of pieces of the authentication information, wherein the determination unit determines whether each of the plurality of pieces of authentication information is consistent with the comparison information, and wherein the authentication unit, when it is determined that each of the plurality of pieces of authentication information is consistent with the comparison information, authenticates the other communication device as an opposite communication party.

(3) The communication device according to (2), wherein a standard acquisition sequence is set in the plurality of pieces of authentication information, the standard acquisition sequence being an order of the plurality of pieces of authentication information to be acquired by the other communication device, and wherein the authentication unit, when it is determined that each of the plurality of pieces of authentication information is consistent with the comparison image information and the other communication device acquires the plurality of pieces of authentication information in the order of the standard acquisition sequence, authenticates the other communication device as an opposite communication party.

(4) The communication device according to any one of (1) to (3), wherein the determination unit determines whether a portion of the authentication information is consistent with the comparison information, and wherein the authentication unit, when it is determined that the portion of the authentication information is consistent with the comparison information, authenticates the other communication device as an opposite communication party.

(5) The communication device according to any one of (1) to (4), wherein the determination unit determines whether a feature portion of the comparison information is consistent with a feature portion of the authentication information, and wherein the authentication unit, when it is determined that the feature portion of the comparison information is consistent with the feature portion of the authentication information, authenticates the other communication device as an opposite communication party.

(6) A communication method comprising:

determining whether authentication information recognizable by a user of another communication device is consistent with comparison information transmitted from the other communication device capable of obtaining and transmitting the authentication information; and authenticating, when it is determined that the authentication information is consistent with the comparison information, the other communication as an opposite communication party.

(7) A program for causing a computer to perform:

a determination function for determining whether authentication information recognizable by a user of another communication device is consistent with comparison information transmitted from the other communication device capable of obtaining and transmitting the authentication information; and an authentication function, when it is determined that the authentication information is consistent with the comparison information, for authenticating the other communication device as an opposite communication party.

What is claimed is:

1. A communication device comprising:
a microphone; and
a storage for storing a program that performs following steps: (i) determine whether authentication information presented to a user of a second communication device is consistent with comparison information transmitted from the second communication device; and (ii) when it is determined that the authentication information is consistent with the comparison information, to perform an authenticating process in which the second communication device is authenticated as an opposite communication party, such that the user of the second communication device does not enter a password during the authenticating process,
in which the program is further configured to determine whether ambient noise detected by the microphone exceeds a predetermined value and when a determination result therefrom indicates that the detected ambient noise exceeds the predetermined value to cause the authentication information to be an image or images, and
in which when the authentication information is the image or images, the comparison information is obtained from an image or images captured by the second communication device which are displayed on a display of the communication device.

2. The communication device according to claim 1, wherein the program determines whether a portion of the authentication information is consistent with the comparison information, and
when it is determined that the portion of the authentication information is consistent with the comparison information, authenticates the second communication device as the opposite communication party.

3. The communication device according to claim 1, wherein the program determines whether a feature portion of the comparison information is consistent with a feature portion of the authentication information, and
when it is determined that the feature portion of the comparison information is consistent with the feature portion of the authentication information, authenticates the second communication device as the opposite communication party.

4. A communication method, performed by a communication device, comprising:
determining whether authentication information recognizable by a user of a second communication device is consistent with comparison information transmitted from the second communication device;
performing an authenticating process in which, when it is determined that the authentication information is consistent with the comparison information, the second communication device is authenticated as an opposite communication party, such that the user of the second communication device does not enter a password during the authenticating process; and
determining whether ambient noise detected by a microphone exceeds a predetermined value and when a determination result therefrom indicates that the detected ambient noise exceeds the predetermined value causing the authentication information to be an image or images, and
in which when the authentication information is the image or images, the comparison information is obtained from an image or images captured by the second communication device which are displayed on a display of the communication device.

5. A non-transitory computer readable storage device having stored thereon a program for causing a communication device to perform:

a determination function for determining whether authentication information recognizable by a user of a second communication device is consistent with comparison information transmitted from the second communication device capable of obtaining and transmitting the authentication information;

an authentication process function in which, when it is determined that the authentication information is consistent with the comparison information, the second communication device is authenticated as an opposite communication party, such that the user of the second communication device does not enter a password during the authenticating process; and a determining function for determining whether ambient noise detected by a microphone exceeds a predetermined value and when a determination result therefrom indicates that the detected ambient noise exceeds the predetermined value for causing the authentication information to be an image or images, and in which when the authentication information is the image or images, the comparison information is obtained from an image or images captured by the second communication device which are displayed on a display of the communication device.

* * * * *